US011445534B2

(12) United States Patent
Feng

(10) Patent No.: US 11,445,534 B2
(45) Date of Patent: *Sep. 13, 2022

(54) COMMUNICATION METHOD, TERMINAL EQUIPMENT, AND NETWORK EQUIPMENT

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,798

(22) Filed: May 8, 2020

(65) Prior Publication Data

US 2020/0275470 A1 Aug. 27, 2020

Related U.S. Application Data

(63) Continuation of application No. 15/778,961, filed as application No. PCT/CN2016/073677 on Feb. 5, 2016, now Pat. No. 10,716,130.

(51) Int. Cl.
*H04W 72/12* (2009.01)
*H04W 72/04* (2009.01)
(Continued)

(52) U.S. Cl.
CPC ......... *H04W 72/1284* (2013.01); *H04L 1/189* (2013.01); *H04L 1/1887* (2013.01);
(Continued)

(58) Field of Classification Search
CPC ..... H04L 1/1887; H04L 1/189; H04L 1/1896; H04W 48/16; H04W 72/02; H04W 72/04; H04W 72/1268; H04W 72/1284
See application file for complete search history.

(56) References Cited

U.S. PATENT DOCUMENTS 10,136,462 B2    11/2018  Kim et al.
2007/0121542 A1*  5/2007  Lohr ................... H04L 47/24
                                                   370/329
(Continued)

FOREIGN PATENT DOCUMENTS

CN    1258401 A    6/2000
CN  102638767 A    8/2012
(Continued)

OTHER PUBLICATIONS

International Search Report in international application No. PCT/CN2016/073677, dated Nov. 2, 2016.
(Continued)

*Primary Examiner* — Chi H Pham
*Assistant Examiner* — Vladislav Y Agureyev
(74) *Attorney, Agent, or Firm* — Ladas & Parry, LLP

(57) ABSTRACT

The embodiments of the application provide a communication method, terminal equipment, and network equipment. The method comprises: determining a first data transmission format used to generate first transmission version of uplink data; selecting, from a data resource pool, a first data transmission resource used to transmit the first transmission version; transmitting, to network equipment, a first scheduling configuration message containing information of the first data transmission resource and the first data transmission format; encoding and modulating, according to the first data transmission format, the uplink data, to generate the first transmission version; and transmitting, to the network equipment, by means of the first data transmission resource, the first transmission version, so as to facilitate the network equipment to receive, demodulate and decode, according to the first scheduling configuration message, the first transmission version. The embodiments of the invention can
(Continued)

reduce communication latency without decreasing communication reliability.

22 Claims, 17 Drawing Sheets

(51) Int. Cl.
*H04L 1/18* (2006.01)
*H04W 48/16* (2009.01)
*H04W 72/02* (2009.01)

(52) U.S. Cl.
CPC .......... *H04L 1/1896* (2013.01); *H04W 48/16* (2013.01); *H04W 72/02* (2013.01); *H04W 72/04* (2013.01); *H04W 72/1268* (2013.01)

(56) References Cited

U.S. PATENT DOCUMENTS

| | | | |
|---|---|---|---|
| 2009/0232101 A1* | 9/2009 | Papasakellariou | H04W 52/48 370/335 |
| 2013/0250878 A1 | 9/2013 | Sayana et al. | |
| 2014/0198772 A1 | 7/2014 | Baldemair et al. | |
| 2014/0254544 A1 | 9/2014 | Kar Kin Au et al. | |
| 2015/0264677 A1* | 9/2015 | He | H04W 8/005 370/312 |
| 2015/0271840 A1 | 9/2015 | Tavildar et al. | |
| 2015/0327315 A1 | 11/2015 | Xue et al. | |
| 2015/0382324 A1 | 12/2015 | Sheng et al. | |
| 2016/0037572 A1 | 2/2016 | Yeh et al. | |
| 2016/0081108 A1 | 3/2016 | Tseng | |
| 2016/0323911 A1 | 11/2016 | Au et al. | |
| 2016/0345312 A1 | 11/2016 | Kim et al. | |
| 2017/0041971 A1 | 2/2017 | Kim et al. | |
| 2017/0055281 A1* | 2/2017 | Islam | H04W 72/1289 |
| 2017/0215203 A1 | 7/2017 | Lee et al. | |
| 2017/0347394 A1 | 11/2017 | Yasukawa et al. | |
| 2017/0359835 A1 | 12/2017 | Seo et al. | |
| 2018/0007606 A1 | 1/2018 | Lee et al. | |
| 2018/0020365 A1 | 1/2018 | Xiong et al. | |
| 2018/0248645 A1* | 8/2018 | Bayesteh | H04W 72/0413 |
| 2018/0249488 A1 | 8/2018 | Au et al. | |
| 2018/0249489 A1 | 8/2018 | Au et al. | |
| 2018/0249490 A1 | 8/2018 | Au et al. | |
| 2018/0249491 A1 | 8/2018 | Au et al. | |
| 2018/0279393 A1* | 9/2018 | Liu | H04W 4/70 |
| 2018/0317239 A1 | 11/2018 | Wang et al. | |
| 2018/0324660 A1* | 11/2018 | Jung | H04W 48/16 |
| 2019/0261442 A1 | 8/2019 | Yoon | |

FOREIGN PATENT DOCUMENTS

| | | | |
|---|---|---|---|
| CN | 102932924 A | 2/2013 | |
| CN | 103051413 A | 4/2013 | |
| CN | 103220680 A | 7/2013 | |
| CN | 103378936 A | 10/2013 | |
| CN | 104010275 A | 8/2014 | |
| CN | 104735785 A | 6/2015 | |
| CN | 105075354 A | 11/2015 | |
| CN | 105187312 A | 12/2015 | |
| CN | 105284172 A | 1/2016 | |
| CN | 105745945 A | 7/2016 | |
| CN | 103051413 B | 12/2016 | |
| CN | 107251641 A | 10/2017 | |
| CN | 105075354 B | 6/2019 | |
| CN | 105745945 B | 10/2019 | |
| EP | 2731392 A1 | 5/2014 | |
| JP | 2015156561 A | 8/2015 | |
| JP | 2018509812 A | 4/2018 | |
| WO | 2013107312 A1 | 7/2013 | |
| WO | 2015070903 A1 | 5/2015 | |
| WO | 2015160197 A1 | 10/2015 | |
| WO | 2015199340 A1 | 12/2015 | |
| WO | 2016153548 A1 | 9/2016 | |

OTHER PUBLICATIONS

English translation of the Written Opinion of the International Search Authority in the international application No. PCT/CN2016/073677, dated Nov. 2, 2016.
Ericsson; "Physical layer aspects of TTI shortening for downlink transmissions", 3GPP TSG RAN WG1 Meeting #83 R1-157148, Nov. 22, 2015(Nov. 22, 2015) the Whole document.
Ericsson; "Physical layer aspects of short TTI for uplink transmissions" 3GPP TSG RAN WG1 Meeting #83 R1-157149, Nov. 22, 2015(Nov. 22, 2015), the whole document.
Supplementary European Search Report in the European application No. 16888824.6, dated Jun. 13, 2019.
First Office Action of the Japanese application No. 2018-530074, dated Aug. 30, 2019.
First Office Action of the Chinese application No. 201680064248.1, dated May 11, 2020, with search report.
First Office Action of the European application No. 16888824.6, dated Mar. 31, 2020.
First Office Action of the Taiwanese application No. 106103399, dated Apr. 21, 2020.
Office Action of the Indian application No. 201817026817, dated Jun. 29, 2020.
Non-Final Office Action of the U.S. Appl. No. 15/778,961, dated Oct. 18, 2019.
Notice of Allowance of the U.S. Appl. No. 15/778,961, dated Feb. 7, 2020.
Corrected Notice of Allowance of the U.S. Appl. No. 15/778,961, dated Jun. 11, 2020.
Second Office Action of the European application No. 16888824.6, dated Mar. 3, 2021.
Panasonic; "Discussion on resource allocation and transport format signaling", 3GPP TSG-RAN WG1 Meeting #50, R1-073610, Aug. 24, 2007, entire document.
Second Office Action of the Chinese application No. 201680064248.1, dated Aug. 4, 2020, with search report.
First Office Action of the Japanese application No. 2020-082039, dated Jul. 16, 2021.
Decision of Refusal of the Japanese application No. 2020-082039, dated Jan. 7, 2022.

\* cited by examiner

COMMUNICATION METHOD, TERMINAL EQUIPMENT, AND NETWORK EQUIPMENT

CROSS REFERENCE TO RELATED APPLICATIONS

This application is a continuation of U.S. application Ser. No. 15/778,961, filed on May 24, 2018, which is a US national phase application based upon International Application No. PCT/CN2016/073677, filed on Feb. 5, 2016. The entire contents of the above applications are incorporated herein by reference in their entireties.

TECHNICAL FIELD

The disclosure relates to the field of communications, and more particularly, to a communication method, terminal equipment and network equipment.

BACKGROUND

A 5th-Generation (5G) communication technology has increasing requirements on low latency and high reliability of communication. At present, a latency is mainly reduced by adopting a shortened Transmission Time Interval (TTI) technology, namely modifying an existing frame structure and reducing an inter-subframe spacing to shorten a signaling feedback and scheduling period, shorten a round trip latency of a system and speed up the rhythm of data transmission and reception. An inter-subframe spacing of an existing Long Term Evolution (LTE) system is 1 ms (including 14 Orthogonal Frequency Division Multiplexing (OFDM) symbols), and the shortened TTI technology is intended to shorten the inter-subframe spacing to be 0.2-0.5 ms (including 3-7 OFDM symbols). However, even though a shortened TTI is adopted to shorten the sub-interface spacing from 1 ms to 0.2-0.5 ms, the scheduling period may still be shortened by about 2-4 ms only, and the latency is still very long.

Therefore, there is an urgent need for a technical solution capable of reducing communication latency without reducing communication reliability.

SUMMARY

Embodiments of the disclosure provide a communication method, terminal equipment and network equipment, which may reduce communication latency without reducing communication reliability.

A first aspect provides a communication method, which may include that:

a first data transmission format is determined, the first data transmission format being used in generating a first transmission version of uplink (UL) data;

a first data transmission resource is selected from a data resource pool, the first data transmission resource being configured to transmit the first transmission version;

a first scheduling assignment message is sent to network equipment, the first scheduling assignment message containing information of the first data transmission resource and information of the first data transmission format;

the UL data is coded and modulated according to the first data transmission format to generate the first transmission version; and the first transmission version is sent to the network equipment through the first data transmission resource to enable the network equipment to receive, demodulate and decode the first transmission version according to the first scheduling assignment message.

In combination with the first aspect, in a first possible implementation of the first aspect, the method may further include that:

a UL resource scheduling request is sent to the network equipment, wherein the UL resource scheduling request may be configured to request the network equipment to allocate a UL resource to the UL data and the resource scheduling request may include information about an association relationship indicating that the resource scheduling request is associated with the first transmission version, or the scheduling assignment message may further be configured to request the network equipment to allocate the UL resource to the UL data and the scheduling assignment message may include the information about an association relationship indicating that the scheduling assignment message is associated with the first transmission version; and responsive to reception of a UL resource allocation response sent by the network equipment, a second transmission version of the UL data is generated and sent according to a second data transmission format and second data transmission resource indicated in the UL resource allocation response.

In combination with the first aspect or the first possible implementation of the first aspect, in a second possible implementation of the first aspect, the method may further include that:

responsive to reception of a Non-Acknowledge (NACK) message sent by the network equipment for the first transmission version of the UL data, a third data transmission format is determined and a third data transmission resource is selected from the data resource pool, the third data transmission format being used in generating a third transmission version of the UL data and the third data transmission resource being configured to transmit the third transmission version;

a second scheduling assignment message is sent to the network equipment, the second scheduling assignment message containing information of the third data transmission resource and information of the third data transmission format;

the UL data is coded and modulated according to the third data transmission format to generate the third transmission version; and the third transmission version is sent to the network equipment through the third data transmission resource to enable the network equipment to receive, demodulate and decode the third transmission version according to the second scheduling assignment message.

In combination with the first aspect or any possible implementation thereof, in a third possible implementation of the first aspect, the operation that the first data transmission format is determined may include that: the first data transmission format used in generating each of the N first transmission versions is determined, N being an integer equal to or greater than 2; the operation that the first data transmission resource is determined from the data resource pool may include that: N parts of such first data transmission resources are determined from the data resource pool, each of the N first data transmission resources being configured to transmit the first transmission version of the N first transmission versions corresponding to the first data transmission resource, wherein there are one to one correspondences between the N first data transmission resources and the N first transmission versions;

the operation that the first scheduling assignment message is sent to the network equipment may include that: the first scheduling assignment message is sent to the network equipment, the first scheduling assignment message indicating the first data transmission resource and first data transmission format corresponding to each of the N first transmission versions;

the operation that the first transmission version is generated may include that: each first transmission version is generated according to the first data transmission format used in generating the first transmission version; and the operation that the first transmission version is sent to the network equipment may include that: the corresponding versions in the N first transmission versions of the UL data are sent through the N parts of first data transmission resources respectively.

In combination with the third possible implementation of the first aspect, in a fourth possible implementation of the first aspect, the operation that the first scheduling assignment message is sent to the network equipment may include that: N first scheduling assignment messages are sent to the network equipment, wherein the N first scheduling assignment messages may correspond to the N first transmission versions one to one, and each first scheduling assignment message may be configured to indicate the first data transmission format and first data transmission resource for the first transmission version corresponding to the first scheduling assignment message; or the operation that the first scheduling assignment message is sent to the network equipment may include that: one first scheduling assignment message is sent to the network equipment, wherein the one first scheduling assignment message may indicate the first data transmission formats and first data transmission resources for the N first transmission versions.

In combination with the first aspect or any possible implementation thereof, in a fifth possible implementation of the first aspect, the operation that the first scheduling assignment message is sent to the network equipment may include that:

the first scheduling assignment message is sent to the network equipment through a transmission resource which is configured by the network equipment for the first scheduling assignment message; or a control transmission resource is selected from a control resource pool, and the first scheduling assignment message is sent to the network equipment through the control transmission resource.

In combination with the fifth possible implementation of the first aspect, in a sixth possible implementation of the first aspect, before the operation that the first data transmission resource is selected from the data resource pool, the method may further include that:

resource pool configuration information sent by the network equipment is received, the resource pool configuration information including configuration information of the data resource pool and configuration information of the control resource pool, wherein the data resource pool may include the UL resource that is selectable for transmitting the first transmission version, and the control resource pool may include a UL resource that is selectable for transmitting the scheduling assignment message.

A second aspect provides a communication method, which may include that:

an scheduling assignment message sent by terminal equipment is received, the scheduling assignment message indicating a first data transmission format and first data transmission resource corresponding to a first transmission version of UL data sent by the terminal equipment; and the first transmission version of the UL data is received, demodulated and decoded according to the first data transmission format and the first data transmission resource.

In combination with the second aspect, in a first possible implementation of the second aspect, before the operation that the scheduling assignment message sent by the terminal equipment is received, the method may further include that:

a data resource pool is configured to the terminal equipment, the data resource pool including a UL resource that is selectable by the terminal equipment for transmitting the first transmission version; and a control resource pool is configured to the terminal equipment, the control resource pool including a UL resource that is selectable by the terminal equipment for transmitting the scheduling assignment message, or the UL resource configured to transmit the scheduling assignment message is configured to the terminal equipment.

In combination with the second aspect or the first possible implementation thereof, in a second possible implementation of the second aspect, the method may further include that:

a UL resource scheduling request sent by the terminal equipment is received, wherein the UL resource scheduling request may be configured to request network equipment to allocate a UL resource to the UL data and the resource scheduling request may include information about an association relationship indicating that the resource scheduling request is associated with the first transmission version, or the scheduling assignment message may further be configured to request the network equipment to allocate the UL resource to the UL data and the scheduling assignment message may include the information about an association relationship indicating that the scheduling assignment message is associated with the first transmission version;

responsive to the condition that the first transmission version is not received or the first transmission version is failed to be demodulated or decoded, a second data transmission resource is allocated to the UL data, and a second data transmission format is determined; and a UL resource allocation response is sent to the terminal equipment, wherein the UL resource allocation response may be configured to indicate the second data transmission resource and the second data transmission format to enable the terminal equipment to generate a second transmission version of the terminal equipment according to the second data transmission resource and the second data transmission format.

In combination with the second possible implementation of the second aspect, in a third possible implementation of the second aspect, the method may further include that:

responsive to successful decoding of the first transmission version of the UL data, an Acknowledge (ACK) message is sent to the terminal equipment, and the UL resource scheduling request is neglected.

In combination with the second aspect or any possible implementation thereof, in a fourth possible implementation of the second aspect, the method may further include that:

responsive to the condition that the first transmission version is not received or the first transmission version is failed to be demodulated or decoded, NACK information is sent to the terminal equipment.

In combination with the second aspect or any possible implementation thereof, in a fifth possible implementation of the second aspect, a first scheduling assignment message may be configured to indicate a first data transmission format and first data transmission resource corresponding to each of N first transmission versions of the UL data sent by the terminal equipment, N being an integer equal to or greater than 2; and the operation that the first transmission version is received, demodulated and decoded may include that: the N first transmission versions are received, demodulated and decoded according to the first data transmission format and first data transmission resource corresponding to each of the N first transmission versions.

In combination with the fifth possible implementation of the second aspect, in a sixth possible implementation of the second aspect, each first transmission version may be decoded independently, or the N first transmission versions may be jointly decoded.

In combination with the sixth possible implementation of the second aspect, in a seventh possible implementation of the second aspect, the method may further include that:

if each first transmission version is decoded independently and the N first transmission versions include a transmission version which may be successfully decoded, the ACK message is sent to the terminal equipment; and if each first transmission version is decoded independently and none of the N first transmission versions is successfully decoded, a NACK message or a UL resource allocation message is sent to the terminal equipment, the NACK message including information of the first transmission versions which are failed to be decoded to enable the terminal equipment to learn about the first transmission versions which are failed to be decoded and the UL resource allocation message indicating the second data transmission resources and second data transmission formats determined for the terminal equipment to enable the terminal equipment to generate the second transmission version of the terminal equipment according to the second data transmission resources and the second data transmission formats.

In combination with the sixth possible implementation of the second aspect, in an eighth possible implementation of the second aspect, the method may further include that:

if the N first coded versions are jointly decoded and joint decoding succeeds, the ACK message is sent to the terminal equipment; or if the N first coded versions are jointly decoded and joint decoding fails, the NACK message or the UL resource allocation message is sent to the terminal equipment, the NACK message including information of the first transmission versions which are failed to be decoded to enable the terminal equipment to learn about the first transmission versions which are failed to be decoded and the UL resource allocation message indicating the second data transmission resources and second data transmission formats determined for the terminal equipment to enable the terminal equipment to generate the second transmission version of the terminal equipment according to the second data transmission resources and the second data transmission formats.

In combination with any one of the fifth to eighth possible implementations of the second aspect, in a ninth possible implementation of the second aspect, the operation that the scheduling assignment message sent by the terminal equipment is received may include that:

N first scheduling assignment messages sent by the terminal equipment are received, wherein the N first scheduling assignment messages may correspond to the N first transmission versions one to one, and each first scheduling assignment message may be configured to indicate the first data transmission format and first data transmission resource for the first transmission version corresponding to the first scheduling assignment message; or one first scheduling assignment message sent by the terminal equipment is received, wherein the one first scheduling assignment message may indicate the first data transmission formats and first data transmission resources for the N first transmission versions.

In combination with the second aspect and any possible implementation thereof, in a tenth possible implementation of the second aspect, the operation that the scheduling assignment message sent by the terminal equipment is received may include that:

blind detection is performed on the scheduling assignment message sent by the terminal equipment through a resource indicated by the control resource pool; or the scheduling assignment message sent by the terminal equipment is received through a control resource configured for the scheduling assignment message of the terminal equipment.

A third aspect provides a communication method, which may include that:

a first data transmission format and first data transmission resource corresponding to each of M first coded versions of downlink data are determined, wherein M may be an integer equal to or greater than 2;

the downlink data is modulated and coded to obtain each first coded version according to the first data transmission format corresponding to each first coded version; and each first coded version is sent to terminal equipment through the first data transmission resource corresponding to each first coded version.

In combination with the third aspect, in a first possible implementation of the third aspect, the method may further include that:

a NACK message of the terminal equipment for the M coded versions is received; and a second data transmission format and a second data transmission resource are selected according to the NACK message, and a second transmission version of the downlink data is generated and sent according to the second data transmission format and the second data transmission resource.

A fourth aspect provides a communication method, which may include that:

M first data transmission resources and M first data transmission formats corresponding to M first coded versions of downlink data sent by network equipment are determined, wherein M may be an integer equal to or greater than 2; and each first coded version is received, demodulated and decoded according to the M first data transmission resources and the M first data transmission formats.

In combination with the fourth aspect, in a first possible implementation of the fourth aspect, the operation that each first coded version is received, demodulated and decoded may include that: each first coded version is decoded independently, or the M first coded versions are jointly decoded.

In combination with the first possible implementation of the fourth aspect, in a second possible implementation of the fourth aspect, the method may further include that:

responsive to the condition that each first transmission version is decoded independently and the M first transmission versions include a transmission version which may be successfully decoded, an ACK message is sent to the network equipment; and responsive to the condition that each first transmission version is decoded independently and none of the M transmission versions is successfully decoded, a NACK message is sent to the network equipment, wherein the NACK message may include information of the first transmission versions which are failed to be decoded to enable the network equipment to learn about the first transmission versions which are failed to be decoded.

In combination with the first possible implementation of the fourth aspect, in a third possible implementation of the fourth aspect, the method may further include that:

responsive to the condition that N first coded versions are jointly decoded and joint decoding succeeds, the ACK message is sent to the network equipment; or responsive to the condition that the M first coded versions are jointly decoded and joint decoding succeeds, the NACK message is sent to the network equipment, wherein the NACK message may include information of the N first transmission versions.

A fifth aspect provides terminal equipment, which is configured to execute the method in the first aspect or any possible implementation of the first aspect. Specifically, the terminal equipment includes units configured to execute the method in the first aspect or any possible implementation of the first aspect.

A sixth aspect provides network equipment, which is configured to execute the method in the second aspect or any possible implementation of the second aspect. Specifically, the network equipment includes units configured to execute the method in the second aspect or any possible implementation of the second aspect.

A seventh aspect provides network equipment, which is configured to execute the method in the third aspect or any possible implementation of the third aspect. Specifically, the network equipment includes units configured to execute the method in the third aspect or any possible implementation of the third aspect.

An eighth aspect provides terminal equipment, which is configured to execute the method in the fourth aspect or any possible implementation of the fourth aspect. Specifically, the terminal equipment includes units configured to execute the method in the fourth aspect or any possible implementation of the fourth aspect.

A ninth aspect provides terminal equipment, which includes: a memory and a processor, the memory is configured to store instructions, the processor is configured to execute the instructions stored in the memory, and when the processor executes the instructions stored in the memory, such execution enables the processor to execute the method in the first aspect or any possible implementation of the first aspect.

A tenth aspect provides network equipment, which includes: a memory and a processor, the memory is configured to store instructions, the processor is configured to execute the instructions stored in the memory, and when the processor executes the instructions stored in the memory, such execution enables the processor to execute the method in the second aspect or any possible implementation of the second aspect.

An eleventh aspect provides network equipment, which includes: a memory and a processor, the memory is configured to store instructions, the processor is configured to execute the instructions stored in the memory, and when the processor executes the instructions stored in the memory, such execution enables the processor to execute the method in the third aspect or any possible implementation of the third aspect.

A twelfth aspect provides terminal equipment, which includes: a memory and a processor, the memory is configured to store instructions, the processor is configured to execute the instructions stored in the memory, and when the processor executes the instructions stored in the memory, such execution enables the processor to execute the method in the fourth aspect or any possible implementation of the fourth aspect.

A thirteenth aspect provides a computer storage medium having stored thereon program codes for executing the method in the first aspect or any possible implementation of the first aspect.

A fourteenth aspect provides a computer storage medium having stored thereon program codes for executing the method in the second aspect or any possible implementation of the second aspect.

A fifteenth aspect provides a computer storage medium having stored thereon program codes for executing the method in the third aspect or any possible implementation of the third aspect.

A sixteenth aspect provides a computer storage medium having stored thereon program codes for executing the method in the fourth aspect or any possible implementation of the fourth aspect.

Therefore, in the embodiments of the disclosure, the terminal equipment independently determines the data transmission format and independently selects the data transmission resource from the data resource pool to generate and transmit the transmission version of the UL data, and sends the scheduling assignment message to the network equipment to indicate the data transmission resource and data transmission format adopted to send the UL data. A scheduling-free data transmission manner is implemented, a three-step flow including that "the terminal equipment reports the resource scheduling request", "the network equipment schedules the UL transmission resource to the terminal equipment" and "the terminal equipment sends the UL data" is avoided, and a latency may be shortened under the condition of not reducing transmission reliability.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skilled in the art according to these drawings without creative work.

DETAILED DESCRIPTION

Figure 1:
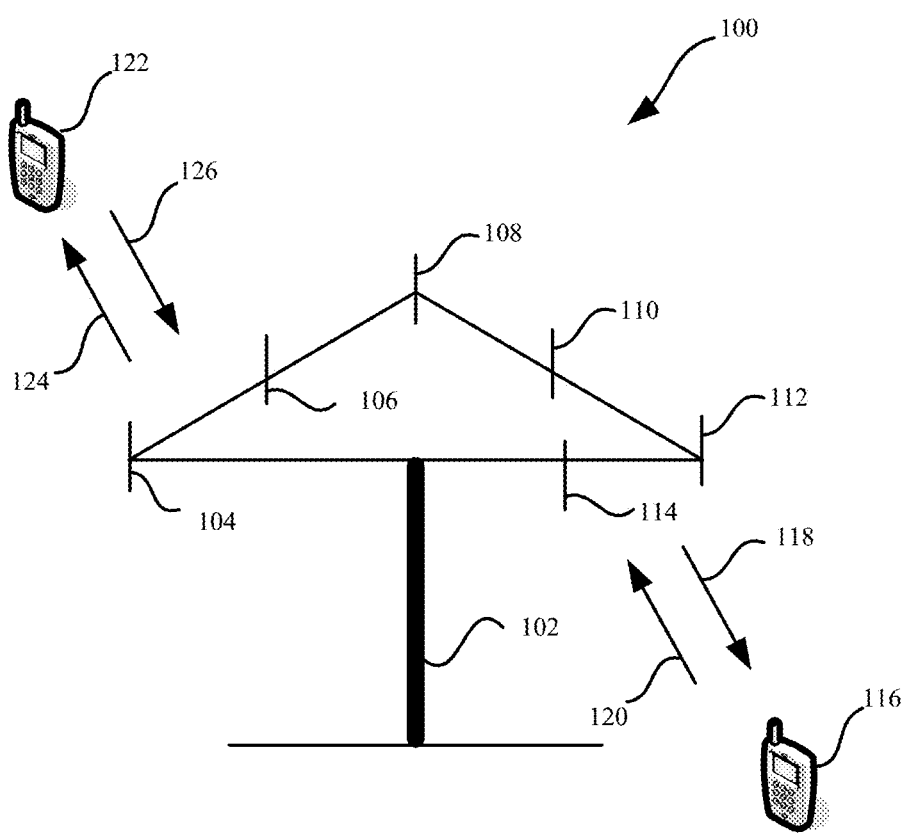
FIG. 1 is a diagram of an application scenario according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on computing equipment and the computing equipment may both be parts. One or more parts may reside in a process and/or an execution thread, and the parts may be located on a computer and/or distributed between two or more computers. In addition, these parts may be executed from various computer-readable media with various data structures stored thereon. The parts may communicate through local and/or remote processes according to, for example, signals with one or more data groups (for example, data from two parts interacting with another part of a local system, a distributed system and/or a network, for example, the Internet interacting with another system through a signal).

Various embodiments of the disclosure are described in combination with terminal equipment and network equipment. The terminal equipment may also be called as an access terminal, a user unit, a user station, a mobile radio station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment and terminal equipment in a future 5G network. The network equipment may be configured to communicate with mobile equipment, and the network equipment may be a Base Transceiver Station (BTS) in a Global System for Mobile Communication (GSM) or Code Division Multiple Access (CDMA), may also be an NB (NodeB) in Wideband Code Division Multiple Access (WCDMA), and may further be an Evolutional Node B (eNB or eNodeB) in LTE, or a relay station or access point, or vehicle-mounted equipment, wearable equipment and network equipment in the future 5G network.

In addition, each aspect or characteristic of the disclosure may be implemented into a method, a device or a product programmed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more pieces of equipment and/or other machine-readable media configured to store information. Term "machine-readable medium" may include, but not limited to, a wireless channel and various other media capable of storing, including and/or bearing instructions and/or data.

FIG. 1 is a schematic diagram of a communication system according to an embodiment of the disclosure. As illustrated in FIG. 1, the communication system 100 includes network equipment 102, and the network equipment 102 may include multiple antenna groups. For example, one antenna group may include antennae 104 and 106, the other antenna group may include antennae 108 and 110, and an additional group may include antennae 112 and 114. In FIG. 1, each antenna group includes 2 antennae, but more or fewer antennae may be used for each group. The network equipment 102 may additionally include a sender chain and a receiver chain. Those of ordinary skilled in the art may know that all of them may include multiple parts (for example, a processor, a modulator, a multiplexer, a demodulator, a de-multiplexer or an antenna) related to signal sending and receiving.

The network equipment 102 may communicate with multiple pieces of a terminal equipment (for example, terminal equipment 116 and terminal equipment 122). However, it can be understood that the network equipment 102 may communicate with any amount of a terminal equipment like the terminal equipment 116 or 122. The terminal equipment 116 and 122 may be, for example, cell phones, smart phones, portable computers, handheld communication equipment, handheld computing equipment, satellite radio devices, global positioning systems, PDAs and/or any other proper equipment configured for communication on the wireless communication system 100.

As illustrated in FIG. 1, the terminal equipment 116 communicates with the antennae 112 and 114, wherein the antennae 112 and 114 send information to the terminal equipment 116 through a forward link 118 and receive information from the terminal equipment 116 through a reverse link 120. In addition, the terminal equipment 122 communicates with the antennae 104 and 106, wherein the antennae 104 and 106 send information to the terminal equipment 122 through a forward link 124 and receive information from the terminal equipment 122 through a reverse link 126.

For example, in a Frequency Division Duplex (FDD) system, for example, the forward link 118 may use a frequency band different from that used by the reverse link 120, and the forward link 124 may use a frequency band different from that used by the reverse link 126.

For another example, in a Time Division Duplex (TDD) system and a full duplex system, the forward link 118 and the reverse link 120 may use the same frequency band, and the forward link 124 and the reverse link 126 may use the same frequency band.

Each group of antennae and/or region designed for communication are/is called as sectors/a sector of the network equipment 102. For example, the antenna group may be designed to communicate with terminal equipment in a sector of coverage area of the network equipment 102. In a process that the network equipment 102 communicates with the terminal equipment 116 and 122 through the forward links 118 and 124 respectively, a sending antenna of the network equipment 102 may use beamforming to improve signal noise ratios of the forward links 118 and 124. In addition, compared with a manner that the network equipment sends signals to all its terminal equipment through a single antenna, when the network equipment 102 sends signals to the terminal equipment 116 and 122 randomly scattered in the related coverage area by virtue of beamforming, mobile equipment in an adjacent cell may be interfered less.

In a given time, the network equipment 102, the terminal equipment 116 or the terminal equipment 122 may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

In the embodiment of the disclosure, multiple pieces of a terminal equipment may multiplex the same time-frequency resource for transmission with the network equipment, so that the network equipment may perform data transmission with the multiple pieces of a terminal equipment at the same time. Since a process of data transmission between the network equipment and each piece of a terminal equipment is similar, for convenient understanding and description, descriptions will be made below with a flow of data transmission between the network equipment and a certain piece of a terminal equipment in the multiple pieces of a terminal equipment as an example.

Figure 2:
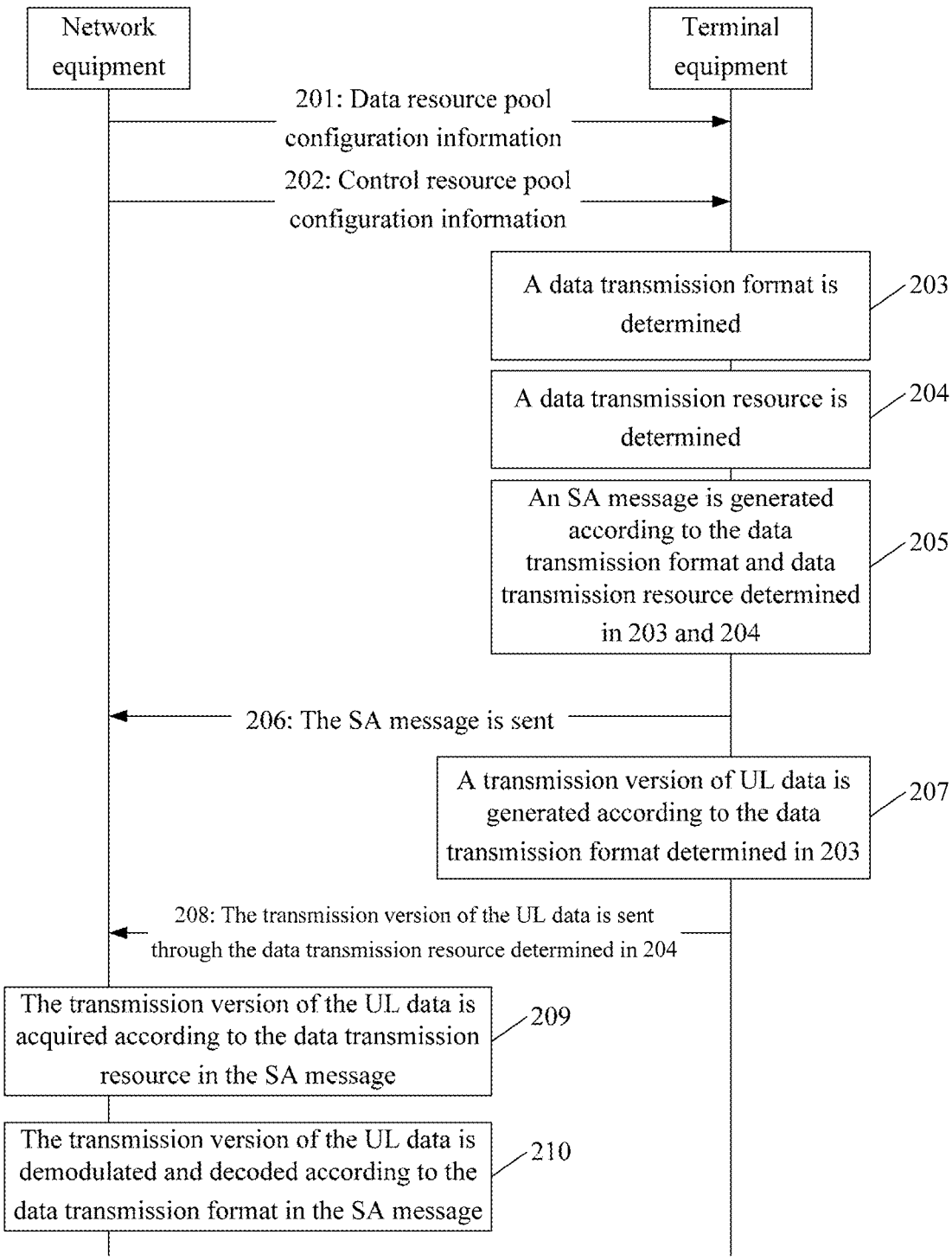
FIG. 2 is a schematic flowchart of a communication method according to an embodiment of the disclosure.

FIG. 2 is a schematic flowchart of a communication method 200 according to an embodiment of the disclosure. As illustrated in FIG. 2, the method 200 includes the following operations.

In 201, network equipment may send data resource pool configuration information to terminal equipment. The data resource pool configuration information indicates a resource in a data resource pool, and the resource in the data resource pool is a resource selectable for the terminal equipment to transmit a transmission version of UL data.

In 202, the network equipment may send control resource pool configuration information to the terminal equipment. The control resource pool configuration information indicates a resource in a control resource pool and the resource in the control resource pool is a resource selectable for the terminal equipment to transmit an scheduling assignment message.

Optionally, the network equipment may send the control resource pool configuration information and the data resource pool configuration information to the terminal equipment by virtue of System Information (SI).

Optionally, in the embodiment of the disclosure, the network equipment may also not send a data resource pool configuration message and/or a control resource pool configuration message to the terminal equipment but statically configure the data resource pool configuration message and/or the control resource pool configuration message in the terminal equipment instead.

Optionally, in the embodiment of the disclosure, the resource of the resource pool is at least defined by two dimensions, i.e., a time domain and a frequency domain, or further includes dimensions such as a code domain and/or a space domain.

In 203, the terminal equipment may determine a data transmission format configured to acquire the transmission version of the UL data.

Optionally, in the embodiment of the disclosure, the data transmission format may include information of a Modulation and Coding Scheme (MCS) and a coded version and the like.

In 204, the terminal equipment may determine a data transmission resource transmitting the transmission version of the UL data.

In 205, the terminal equipment may generate the scheduling assignment message, the scheduling assignment message containing information of the data transmission format determined in 203 and information of the data transmission resource determined in 204.

In 206, the terminal equipment may select a resource sending the scheduling assignment message from the control resource pool and send the scheduling assignment message to the network equipment.

Optionally, in the embodiment of the disclosure, the network equipment may also not send the control resource pool configuration information to the terminal equipment but directly configure the transmission resource to the scheduling assignment message of the terminal equipment instead for the terminal equipment to directly transmit the scheduling assignment message through the transmission resource configured by the network equipment, wherein the network equipment may configure non-overlapping transmission resources configured for scheduling assignment messages to the terminal equipment through SI.

Figure 3:
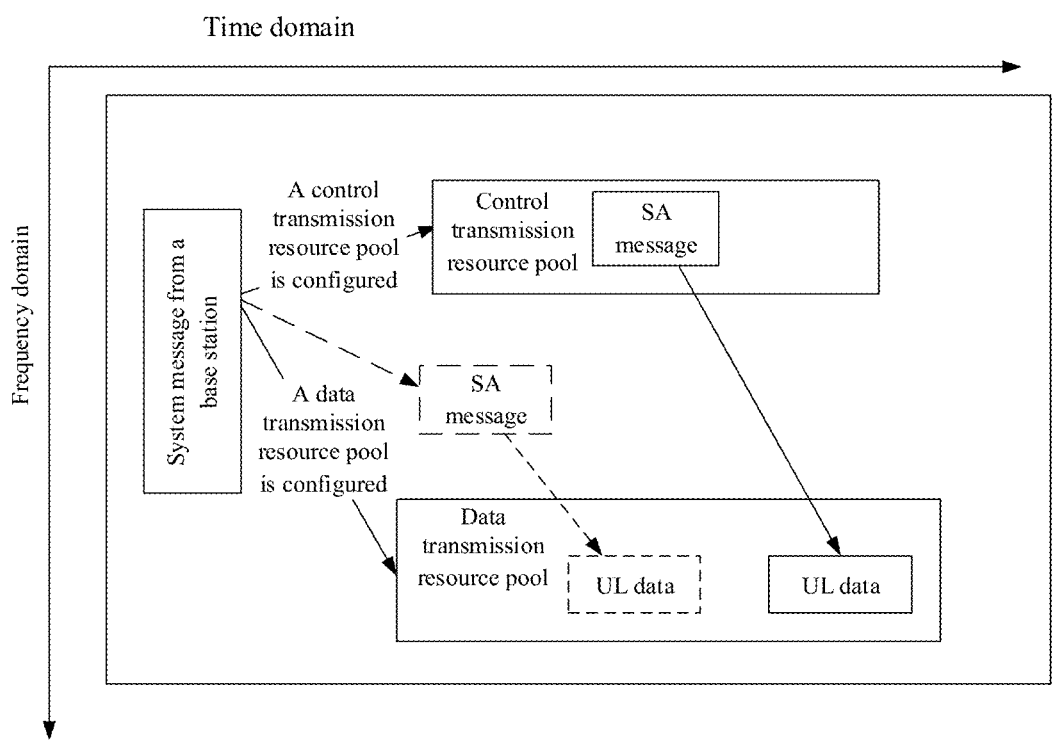
FIG. 3 is a schematic diagram of a communication method according to an embodiment of the disclosure.

For example, as illustrated in FIG. 3, a base station may send a system message. The system message indicates a data transmission resource pool and a control transmission resource pool. The data transmission resource pool is configured to send the transmission version of the UL data, and the control transmission resource pool indicates the data transmission resource and data transmission format for the transmission version of the UL data. Alternatively, the base station may send the system message, and the system message indicates the data resource pool and the resource sending the scheduling assignment message.

In 207, the terminal equipment codes and modulates the UL data to generate the transmission version of the UL data according to the data transmission format determined in 203.

In 208, the terminal equipment sends the transmission version of the UL data by adopting the data transmission resource determined in 204.

In 209, the network equipment receives the transmission version of the UL data sent by the terminal equipment on the data transmission resource indicated in the scheduling assignment message sent by the terminal equipment.

In 210, the network equipment demodulates and decodes the transmission version of the UL data in the data transmission format indicated in the scheduling assignment message sent by the terminal equipment.

In the embodiment of the disclosure, when the network equipment successfully demodulates and decodes the transmission version of the UL data, an ACK message may be sent to the terminal equipment, or when the network equipment fails to demodulate or decode the transmission version of the UL data, a NACK message may be sent to the terminal equipment.

If the terminal equipment receives the NACK message sent by the network equipment, the terminal equipment may determine a new data transmission format, determine a new data transmission resource from the data resource pool and generate and send the transmission version of the UL data according to the new data transmission format and the new data transmission resource.

It will be understood that, in various embodiments of the disclosure, a magnitude of a sequence number of each process does not mean an execution sequence and the execution sequence of each process should be determined by its function and an internal logic and should not form any limit to an implementation process of the embodiment of the disclosure. For example, in the method 200, 202 may be executed and then 201 is executed; and 204 may be executed and then 203 is executed.

Therefore, in the embodiment of the disclosure, the terminal equipment independently determines the data transmission format and independently selects the data transmission resource from the data resource pool to generate and transmit the transmission version of the UL data, and sends the scheduling assignment message to the network equipment to indicate the data transmission resource and data transmission format adopted to send the UL data. A scheduling-free data transmission manner is implemented, a three-step flow including that "the terminal equipment reports the resource scheduling request", "the network equipment schedules the UL transmission resource to the terminal equipment" and "the terminal equipment sends the UL data" is avoided, and a latency may be shortened under the condition of not reducing transmission reliability.

Figure 4:
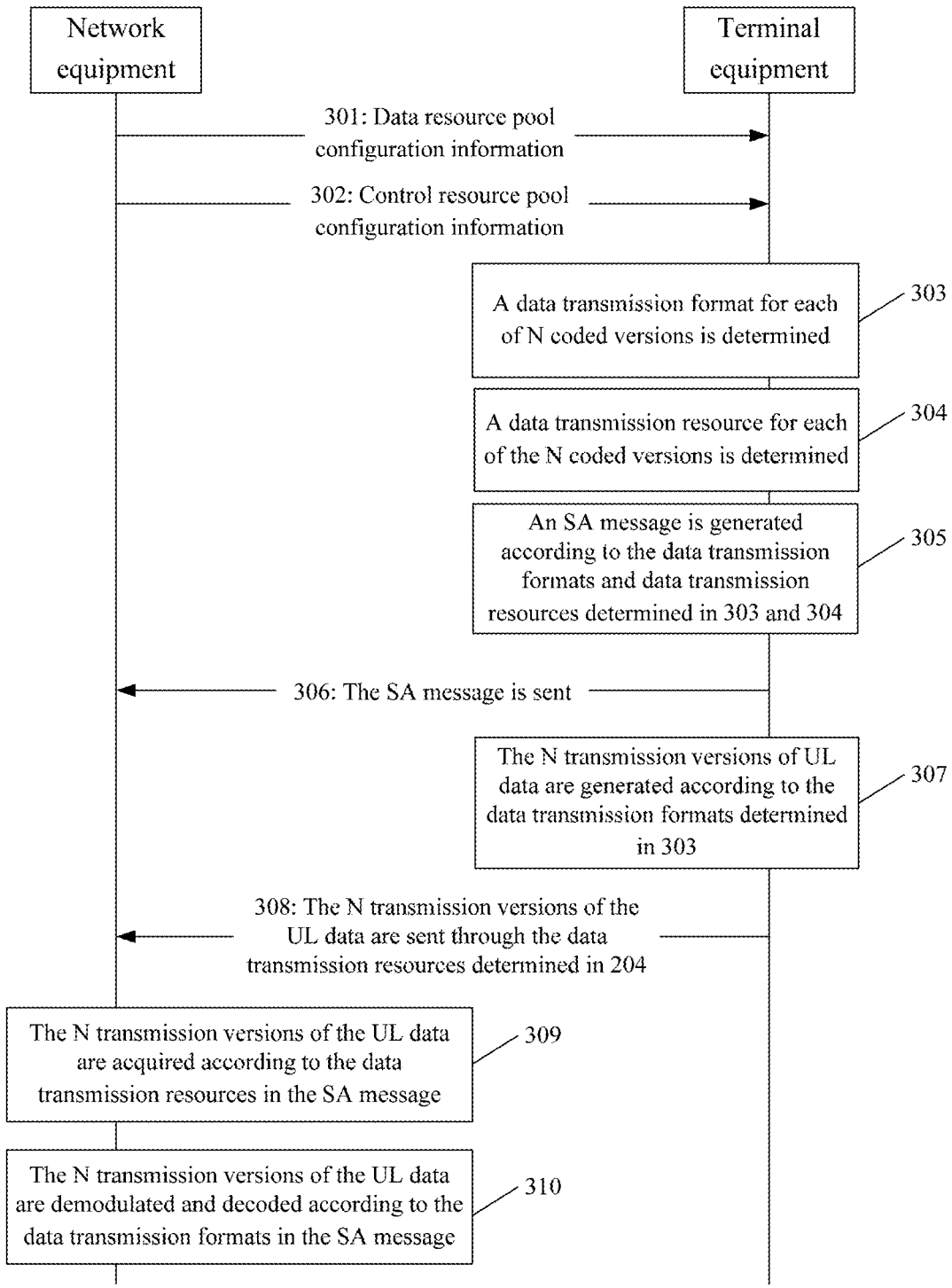
FIG. 4 is a schematic flowchart of a communication method according to an embodiment of the disclosure.

FIG. 4 is a schematic flowchart of a communication method 300 according to an embodiment of the disclosure.

In 301, network equipment may send data resource pool configuration information to a terminal equipment. The data resource pool configuration information indicates a resource in a data resource pool and the resource in the data resource pool is a resource selectable for the terminal equipment to transmit a transmission version of UL data.

In 302, the network equipment may send control resource pool configuration information to the terminal equipment. The control resource pool configuration information indicates a resource in a control resource pool and the resource in the control resource pool is a resource selectable for the terminal equipment to transmit an scheduling assignment message.

Optionally, the network equipment may send the control resource pool configuration information and the data resource pool configuration information to the terminal equipment by virtue of SI.

Optionally, in the embodiment of the disclosure, the network equipment may also not send a data resource pool configuration message and/or a control resource pool configuration message to the terminal equipment but statically configure the data resource pool configuration message and/or the control resource pool configuration message in the terminal equipment instead.

Optionally, in the embodiment of the disclosure, the resource of the resource pool is at least defined by two dimensions, i.e., a time domain and a frequency domain, or further includes dimensions such as a code domain and/or a space domain.

In 303, the terminal equipment may determine a data transmission format configured to generate each transmission version of N transmission versions of the UL data.

Optionally, in the embodiment of the disclosure, the data transmission format may include information of an MCS and a coded version and the like.

In 304, the terminal equipment may determine a data transmission resource transmitting each transmission version of the N transmission versions of the UL data.

Optionally, in the embodiment of the disclosure, the data transmission resources adopted for different transmission versions may be selected from different data resource pools.

In 305, the terminal equipment may generate the scheduling assignment message, the scheduling assignment message containing information of the data transmission formats determined in 303 and information of the data transmission resources determined in 304.

Optionally, in the embodiment of the disclosure, the terminal equipment may generate N scheduling assignment messages, wherein each scheduling assignment message indicates the data transmission format and data transmission resource corresponding to a transmission version. The terminal equipment may also generate only one scheduling assignment message. Here, the one scheduling assignment message may indicate the data transmission formats and data transmission resources corresponding to the N transmission versions of the UL data.

In 306, the terminal equipment may select a resource sending the scheduling assignment message from the control resource pool and send the scheduling assignment message to the network equipment.

Optionally, in the embodiment of the disclosure, the network equipment may also not send the control resource pool configuration information to the terminal equipment but directly configure the transmission resource to the scheduling assignment message of the terminal equipment instead for the terminal equipment to directly transmit the scheduling assignment message through the transmission resource configured by the network equipment. Here, the network equipment may configure non-overlapping transmission resources configured for scheduling assignment messages to the terminal equipment through SI.

For convenient understanding, four implementations of the scheduling assignment message will be described below in combination with FIG. 5 to FIG. 8.

Figure 5:
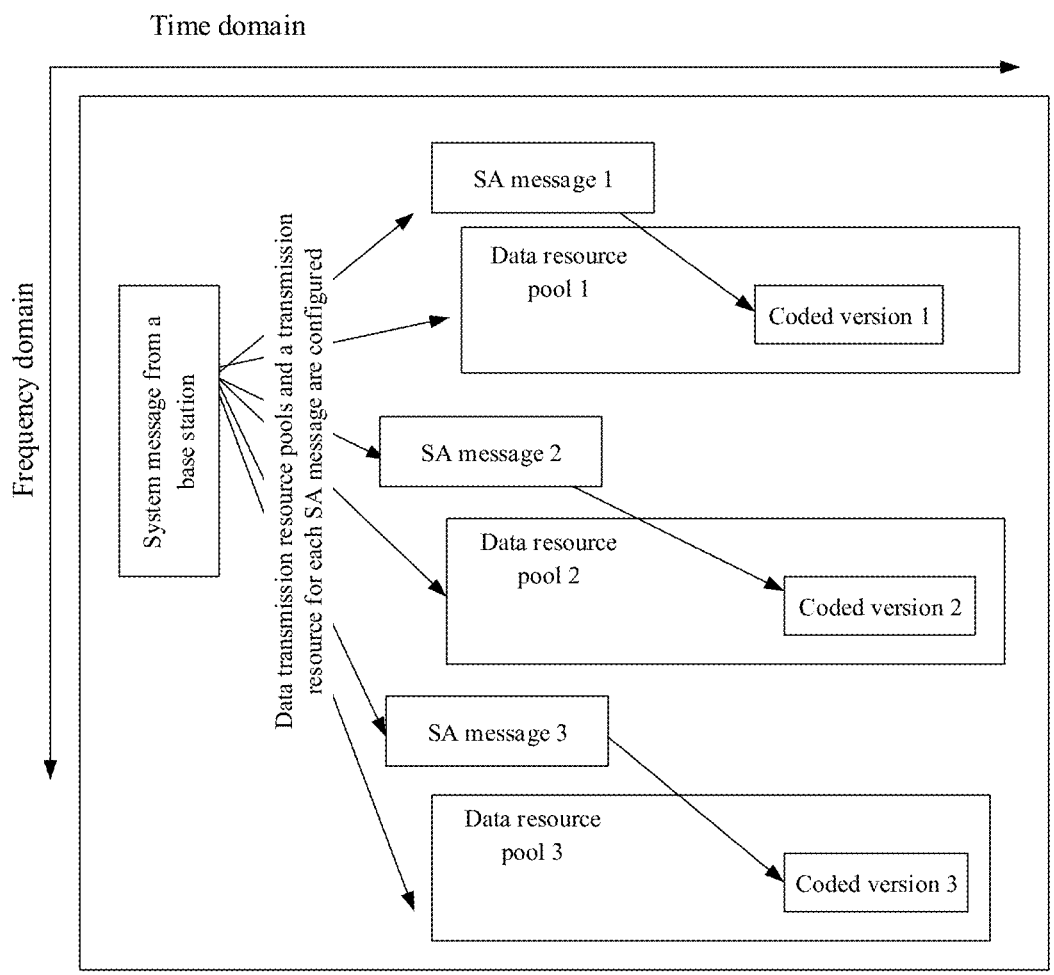
FIG. 5 is a schematic diagram of a communication method according to an embodiment of the disclosure.

In the first implementation, as illustrated in FIG. 5, a base station configures multiple data resource pools (for example, a data resource pool 1, a data resource pool 2 and a data resource pool 3) and transmission resources for multiple scheduling assignment messages (for example, an scheduling assignment message 1, an scheduling assignment message 2 and an scheduling assignment message 3) through SI. A terminal selects transmission resources configured to transmit multiple transmission versions from the multiple data resource pools and generates the multiple scheduling assignment message s (for example, the scheduling assignment message 1, the scheduling assignment message 2 and the scheduling assignment message 3) for the multiple transmission versions (for example, a transmission version 1, a transmission version 2 and a transmission version 3) respectively. Different scheduling assignment messages indicate data transmission formats and data transmission resources of different transmission versions. The terminal transmits each scheduling assignment message through the transmission resources configured by the base station.

Figure 6:
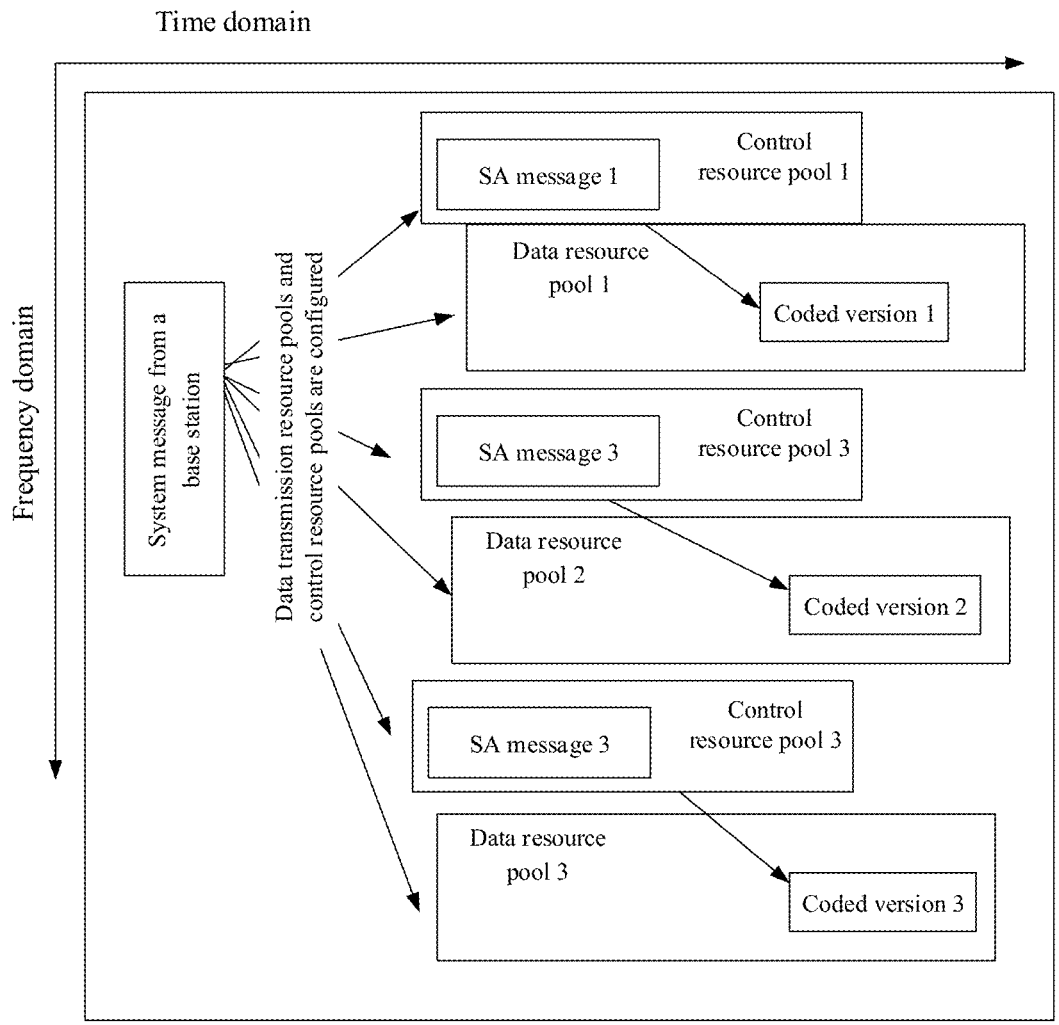
FIG. 6 is a schematic diagram of a communication method according to an embodiment of the disclosure.

In the second implementation, as illustrated in FIG. 6, the base station configures transmission resources of multiple data resource pools (for example, a data resource pool 1, a data resource pool 2 and a data resource pool 3) and multiple control resource pools (for example, a control resource pool 1, a control resource pool 2 and a control resource pool 3) through SI. The terminal selects transmission resources configured to transmit multiple transmission versions from the multiple data resource pools and generates the multiple scheduling assignment message s (for example, an scheduling assignment message 1, an scheduling assignment message 2 and an scheduling assignment message 3) for the multiple transmission versions (for example, a transmission version 1, a transmission version 2 and a transmission version 3) respectively. Different scheduling assignment messages indicate data transmission formats and data transmission resources of different transmission versions respectively. The terminal selects the transmission resources for the multiple scheduling assignment messages from the multiple control resource pools respectively.

Figure 7:
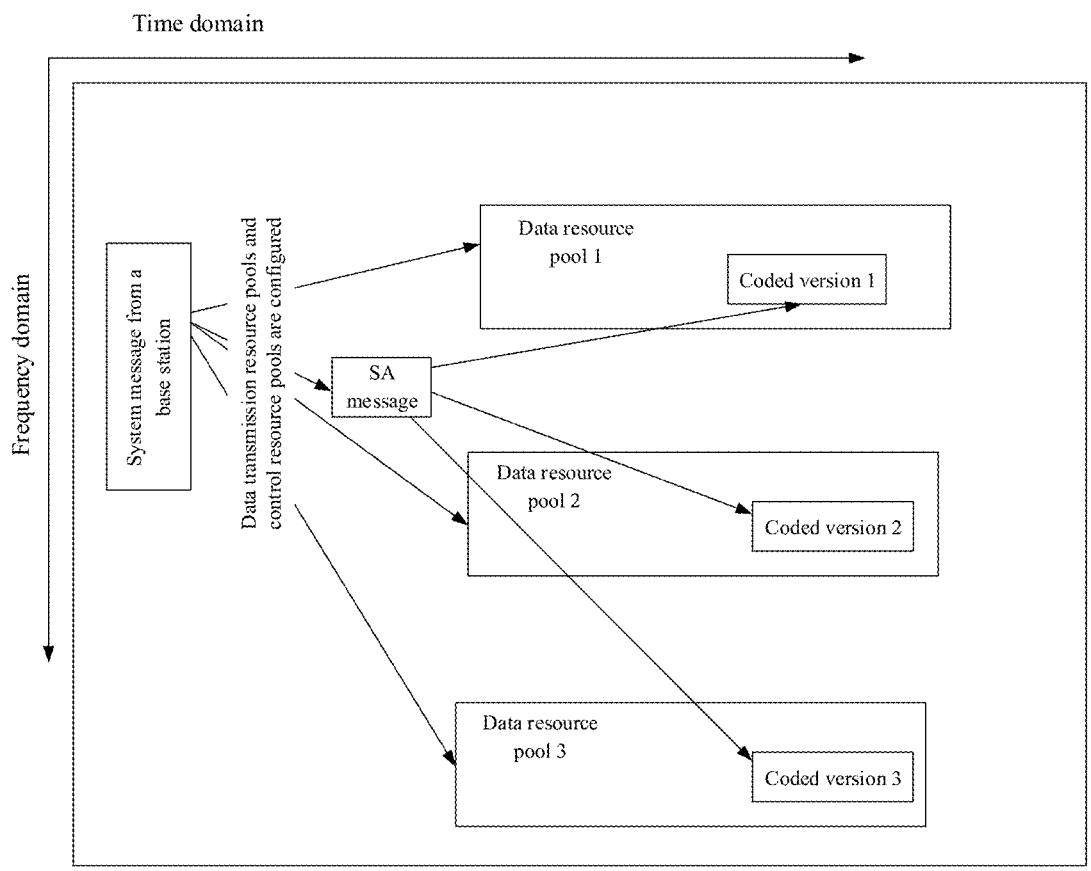
FIG. 7 is a schematic diagram of a communication method according to an embodiment of the disclosure.

In the third implementation, as illustrated in FIG. 7, the base station configures multiple data resource pools (for example, a data resource pool 1, a data resource pool 2 and a data resource pool 3) and a transmission resource of an scheduling assignment message through SI. The terminal selects transmission resources configured to transmit multiple transmission versions from the multiple data resource pools and generates the scheduling assignment message for the multiple transmission versions (for example, a transmission version 1, a transmission version 2 and a transmission version 3) respectively. The scheduling assignment message indicates data transmission formats and data transmission resources of different transmission versions. The terminal transmits the scheduling assignment message through the transmission resource configured by the base station.

Figure 8:
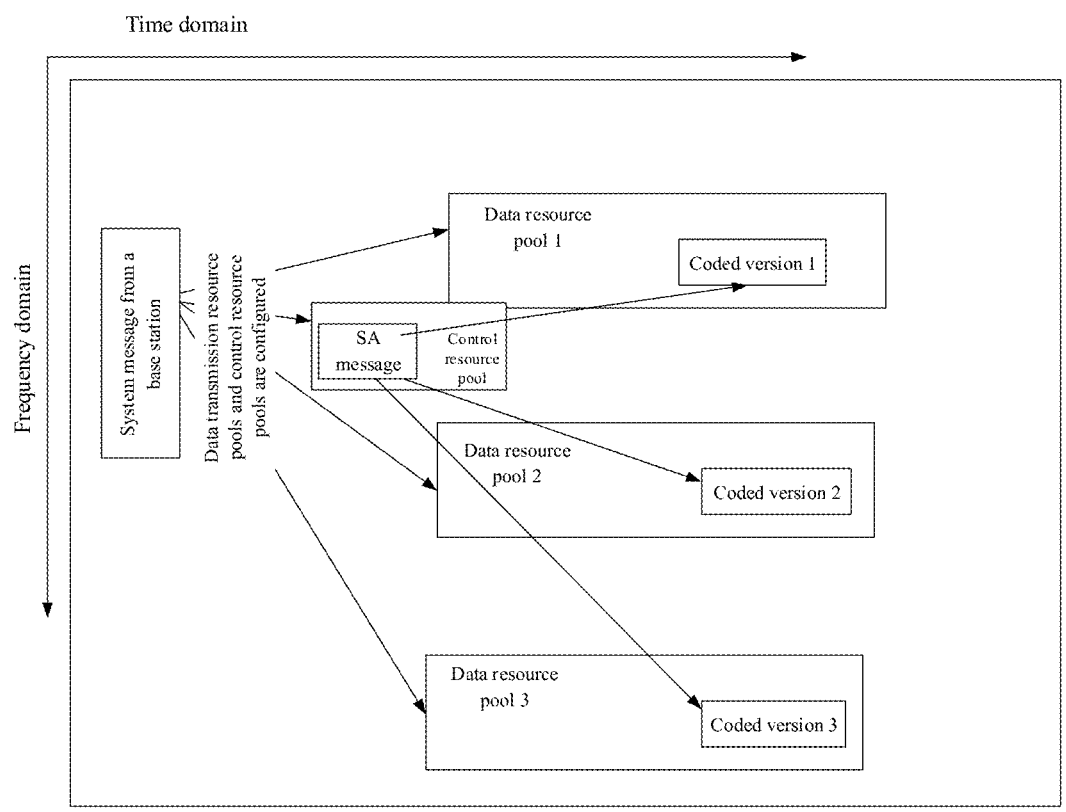
FIG. 8 is a schematic diagram of a communication method according to an embodiment of the disclosure.

In the fourth implementation, as illustrated in FIG. 8, the base station configures multiple data resource pools (for example, a data resource pool 1, a data resource pool 2 and a data resource pool 3) and a control resource pool through SI. The terminal selects transmission resources configured to transmit multiple transmission versions from the multiple data resource pools and generates an scheduling assignment message for the multiple transmission versions (for example, a transmission version 1, a transmission version 2 and a transmission version 3) respectively. The scheduling assignment message indicates data transmission formats and data transmission resources of different transmission versions. The terminal selects a transmission resource for the scheduling assignment message from the configured control resource pool.

In 307, the terminal equipment generates the N transmission versions of the UL data according to the data transmission format, determined in 203, of each transmission version.

In 308, the terminal equipment sends the N transmission versions of the UL data by virtue of N parts of data transmission resources determined in 204. Here, the N parts of transmission resources correspond to the N transmission versions one to one.

In the embodiment of the disclosure, the terminal equipment may concurrently send the N transmission versions. Here, "concurrently" does not always mean strictly the same time but means that there is no need to wait for an acknowledgement message of another transmission version which has been sent before a certain transmission version of the data is sent.

In 309, the network equipment receives the N transmission versions of the UL data sent by the terminal equipment on the data transmission resources indicated in the one or N scheduling assignment messages sent by the terminal equipment.

In 310, the network equipment demodulates and decodes the N transmission versions of the UL data in the data transmission formats, indicated in the one or N scheduling assignment messages sent by the terminal equipment, of the N transmission versions.

Optionally, in the embodiment of the disclosure, the network equipment may decode each transmission version of the N transmission versions of the UL data, and may also jointly decode the N transmission versions (namely combining coded sequences of the multiple transmission versions into a large coded sequence and then decoding it).

Optionally, if the network equipment successfully decodes any transmission version or succeeds in jointly decoding the N transmission versions, an ACK message for the transmitted UL data may be sent to the terminal equipment.

Optionally, if the network equipment does not successfully decode any transmission version or fails to jointly decode the N transmission versions, a NACK message may be sent to the terminal equipment. Here, if the network equipment decodes each transmission version, the network equipment may send a NACK message for each transmission version and each NACK message may contain indication information of the corresponding transmission version to enable the terminal equipment to learn about the transmission versions which are failed to be decoded. If the network equipment jointly decodes the N transmission versions, the network equipment may send one NACK and the NACK contains indication information of the N transmission versions to enable the terminal equipment to learn about the transmission versions which are failed to be jointly decoded. Alternatively, the network equipment may also determine a new data transmission resource and a new data transmission format and send a UL resource message containing the new data transmission format and the new data transmission resource to the terminal equipment to enable the terminal equipment to transmit the UL data according to the new data transmission format and the new data transmission resource. Here, the UL resource message may be sent after the network equipment receives a UL resource request or sent after an scheduling assignment message also configured to request the network equipment for a UL resource. At this moment, the UL resource message may be called as a UL resource response. Specific descriptions may refer to descriptions in FIG. 9.

If the terminal equipment receives the NACK message sent by the network equipment, the terminal equipment may determine a new data transmission format, determine a new data transmission resource from the data resource pool and generate and send the transmission version of the UL data according to the new data transmission format and the new data transmission resource.

It will be understood that the embodiment of the disclosure is described with the condition that the terminal equipment or the network equipment determines the new data transmission format and the new transmission resource in case of a data (UL or downlink) transmission failure as an example. Of course, in case of the data transmission failure, the new data transmission format may also be determined and the resource used before is continued to be used, or the resource used before is continued to be used and the new transmission resource is determined.

It will also be understood that the disclosure is described with the condition that the data transmission resources and data transmission formats of the N transmission versions are all different as an example. The N transmission versions in the embodiment of the disclosure may also adopt the same transmission format but different transmission resources, as long as the N versions may be distinguished and smoothly transmitted.

Therefore, in the embodiment of the disclosure, the terminal equipment determines the data transmission format and selects the data transmission resource from the data resource pool to generate and transmit the transmission version of the UL data, and sends the scheduling assignment message to the network equipment to indicate the data transmission resource and data transmission format adopted to send the UL data. A scheduling-free data transmission manner is implemented, a three-step flow including that "the terminal equipment reports the resource scheduling request", "the network equipment schedules the UL transmission resource to the terminal equipment" and "the terminal equipment sends the UL data" is avoided, and a latency may be shortened under the condition of not reducing transmission reliability.

In the embodiment of the disclosure, for solving the problems of "inter-terminal resource conflict" and mutual interference brought by a manner of randomly selecting a resource from a resource pool, the disclosure further proposes an enhanced method of simultaneously selecting the data transmission resources from multiple data resource pools and sending the UL data at the same time by the terminal equipment, so that a conflict probability may be reduced and UL transmission reliability may be improved. Furthermore, the multiple resource pools of the disclosure may occupy the same time-domain resources but are distinguished on the frequency domain, that is, a "frequency-domain repeating" but time-domain non-repeating method is adopted, so as to achieve low latency and high reliability at the same time.

Figure 9:
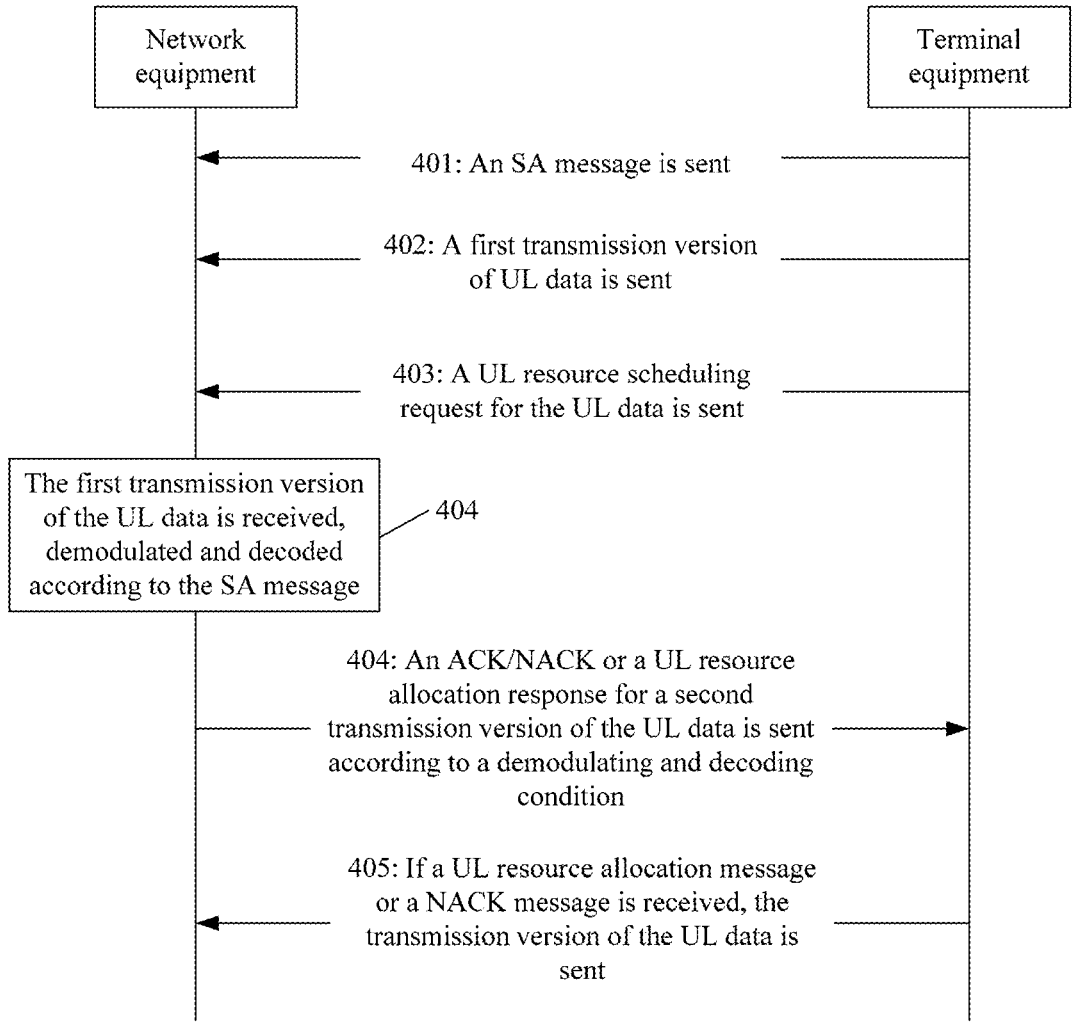
FIG. 9 is a schematic flowchart of a communication method according to an embodiment of the disclosure.

FIG. 9 is a schematic flowchart of a communication method 400 according to an embodiment of the disclosure.

In 401, terminal equipment sends an scheduling assignment message to network equipment, the scheduling assignment message indicating a data transmission resource and data transmission format corresponding to a first transmission version of UL data.

In 402, the terminal equipment sends the first transmission version of the UL data to the network equipment.

In the embodiment of the disclosure, generation and sending of the scheduling assignment message and transmission version of the UL data in 401 and 402 may refer to descriptions in the method 200 or 300 illustrated in FIG. 2 or FIG. 3 and will not be elaborated herein for briefness.

In 403, the terminal equipment sends a UL resource scheduling request to the network equipment, the UL resource scheduling request being configured to request the network equipment to allocate a UL transmission resource to the UL data.

In the embodiment of the disclosure, there are two implementations for the UL resource scheduling request. First, the terminal equipment sends an explicit resource scheduling request. In this mode, the resource scheduling request sent by a terminal includes information about an association relationship between the resource scheduling request and the first transmission version of the UL data sent at the same time, that is, it is indicated that the resource scheduling request is a scheduling request for the UL data rather than other UL data, so that the network equipment may clearly learn about a receiving condition of the UL data the resource scheduling request is for. Second, the resource scheduling request of the terminal is implicitly represented by the scheduling assignment message in 401. In this mode, the terminal equipment will not send an independent resource scheduling request anymore.

In 404, the network equipment receives, demodulates and decodes the first transmission version of the UL data according to the scheduling assignment message sent by the terminal equipment, wherein a UL receiving, demodulating and decoding manner may refer to descriptions in the method 200 or 300 illustrated in FIG. 2 or FIG. 3 and will not be elaborated herein for briefness.

In 404, the network equipment sends an ACK/NACK or a UL resource allocation response to the terminal equipment according to a demodulating and decoding condition of the first transmission version of the UL data.

The network equipment determines whether to send an ACK message or a NACK message (for example, ACK/NACK) and the UL resource allocation response (for example, UL Grant) according to the transmission version demodulating and decoding condition of the first transmission version of the UL data sent by the terminal equipment, specifically as follows.

If the network equipment receives the first transmission version of the UL data sent by the terminal equipment and successfully demodulates and decodes it (for example, Cyclic Redundancy Check (CRC) succeeds), the network equipment only sends an ACK for the data to the terminal equipment, and if the UL resource scheduling request from the terminal is received, the UL resource scheduling request is neglected.

If the network equipment receives the first transmission version of the UL data sent by the terminal equipment but fails to demodulate or decode it (for example, CRC fails), the network equipment may adopt the following processing methods.

The first method: if a network expects a second transmission version of the UL data to be transmitted according to scheduling of the network, the network equipment schedules a UL resource for the terminal according to information in the UL resource scheduling request or/and scheduling assignment message of the terminal and sends a corresponding UL resource allocation response (UL Grant) to the terminal equipment. The UL resource allocation response specifies a transmission format and transmission resource for transmission of the second transmission version of the UL data by the terminal equipment. After the UL resource allocation response is received, the terminal equipment may neglect an ACK/NACK feedback of the network equipment and transmits the second transmission version of the UL data according to UL resource allocation.

The second method: if the network expects the second transmission version of the UL data to be transmitted still by adopting the manner that the terminal independently selects the resource, the network equipment sends a NACK for the transmission version to the terminal and does not send the UL resource allocation response to the terminal. Under this condition, the terminal may independently determine a transmission format and independently select the transmission resource from the resource pool for second transmission according to the same method for first transmission, wherein the selected transmission resource and transmission format may be different from those selected for the first time.

If the network equipment does not receive the first transmission version of the UL data sent by the terminal equipment, the network equipment schedules the UL resource for the terminal according to the information in the UL resource scheduling request or/and scheduling assignment message of the terminal and sends the corresponding UL resource allocation response (UL Grant) to the terminal, and may not send ACK/NACK information.

Figure 10:
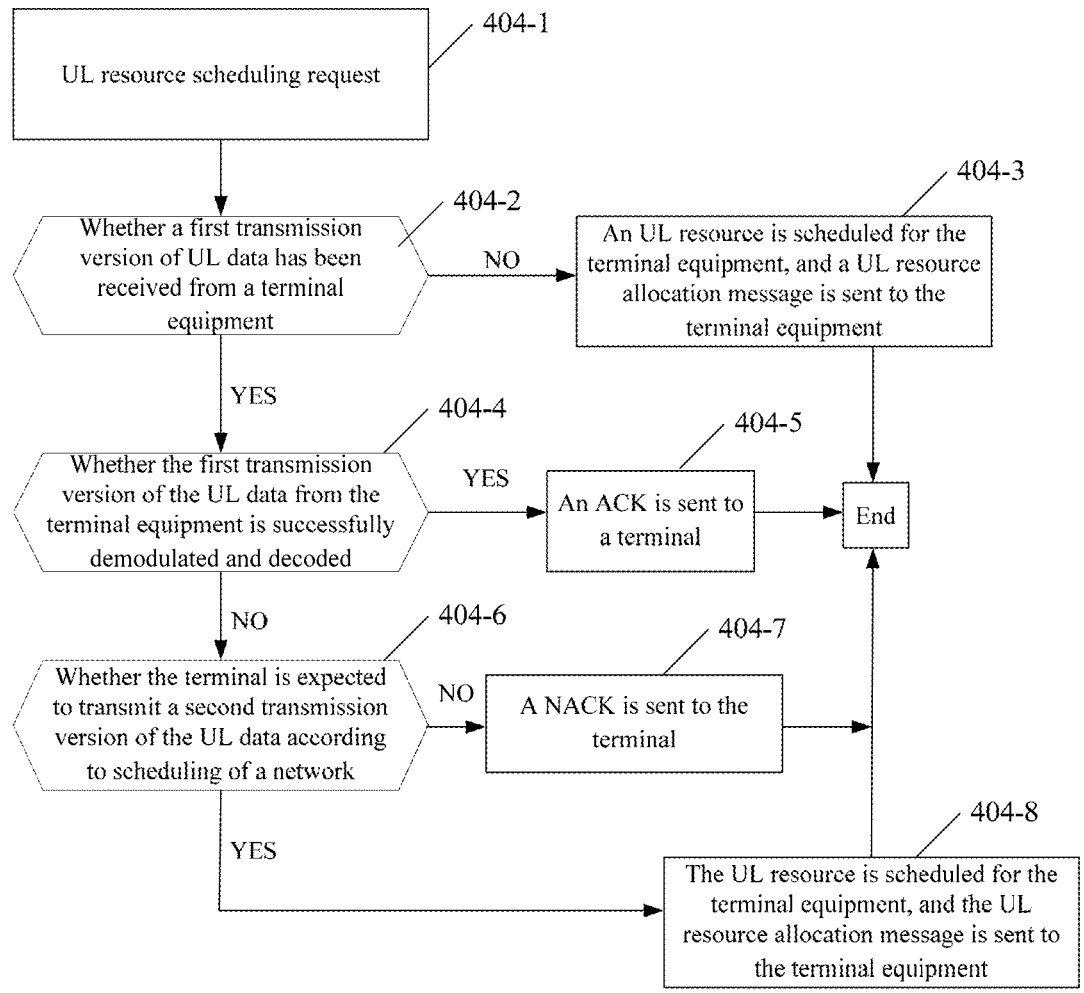
FIG. 10 is a schematic flowchart of a communication method according to an embodiment of the disclosure.

For example, as illustrated in FIG. 10, in 404-1, the network equipment receives a UL resource scheduling request. In 404-2, whether the network equipment receives the UL data from the terminal equipment or not is judged, 404-3 is executed if NO, and if YES, 404-4 is executed. In 404-3, the network equipment schedules a UL resource for the terminal equipment and sends a UL resource scheduling message configured to indicate the UL resource configured to transmit a second transmission version of the UL data. In 404-4, the network equipment determines whether the UL data from the terminal equipment is successfully decoded or not, executes 404-5 if YES, and executes 404-6 if NO. In 404-5, the network equipment sends an ACK message to the terminal equipment. In 404-6, the network equipment selects whether to expect the terminal equipment to transmit the transmission version of the UL data according to scheduling of the network or not, executes 404-7 if NO, and executes 404-8 if YES. In 404-7, the network equipment sends a NACK message to the terminal equipment. In 404-8, the network equipment schedules the UL resource for the terminal equipment and sends a UL resource allocation response configured to indicate the UL resource and transmission format configured to transmit the second transmission version of the UL data.

In 405, if receiving the UL resource allocation response or NACK information, the terminal equipment transmits a third transmission version of the UL data.

Figure 11:
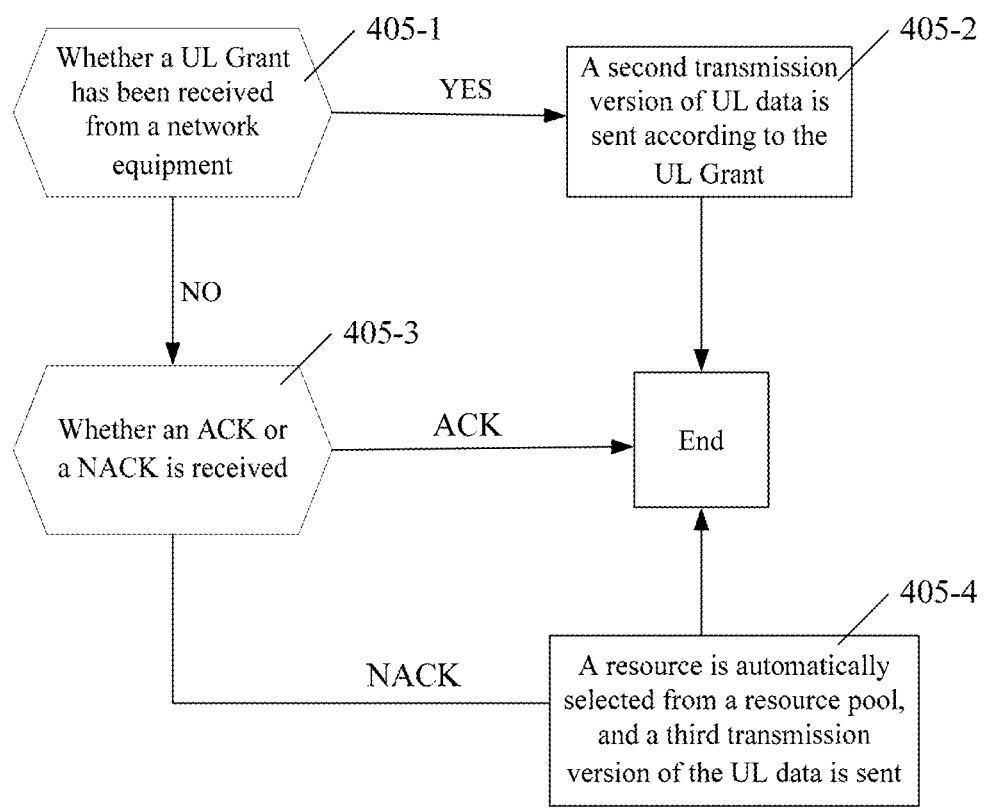
FIG. 11 is a schematic flowchart of a communication method according to an embodiment of the disclosure.

Optionally, as illustrated in FIG. 11, if the terminal equipment receives the UL resource allocation response (UL Grant), the second transmission version of the UL data is sent according to the data transmission resource and data transmission format indicated in the UL Grant (405-2). If no UL Grant is received, 405-3 is executed. In 405-3, if the received acknowledgement (ACK/NACK) message is NACK, the terminal equipment independently determines the transmission format, selects the transmission resource from the resource pool and sends the third transmission version of the UL data (405-4).

Therefore, in the embodiment of the disclosure, a combined scheduling-free and scheduling communication method is adopted, and the method may not bring reliability reduction, spectral efficiency reduction and power requirement increase under any condition but may achieve low latency under some conditions. According to the method, a scheduling-free manner is adopted for UL transmission at first, and in case of a transmission success, a transmission latency may be greatly shortened. In case of a transmission failure, a scheduling manner may be adopted, so that reliability the same as an existing system may be achieved, and meanwhile, the latency is prevented from being prolonged.

Figure 12:
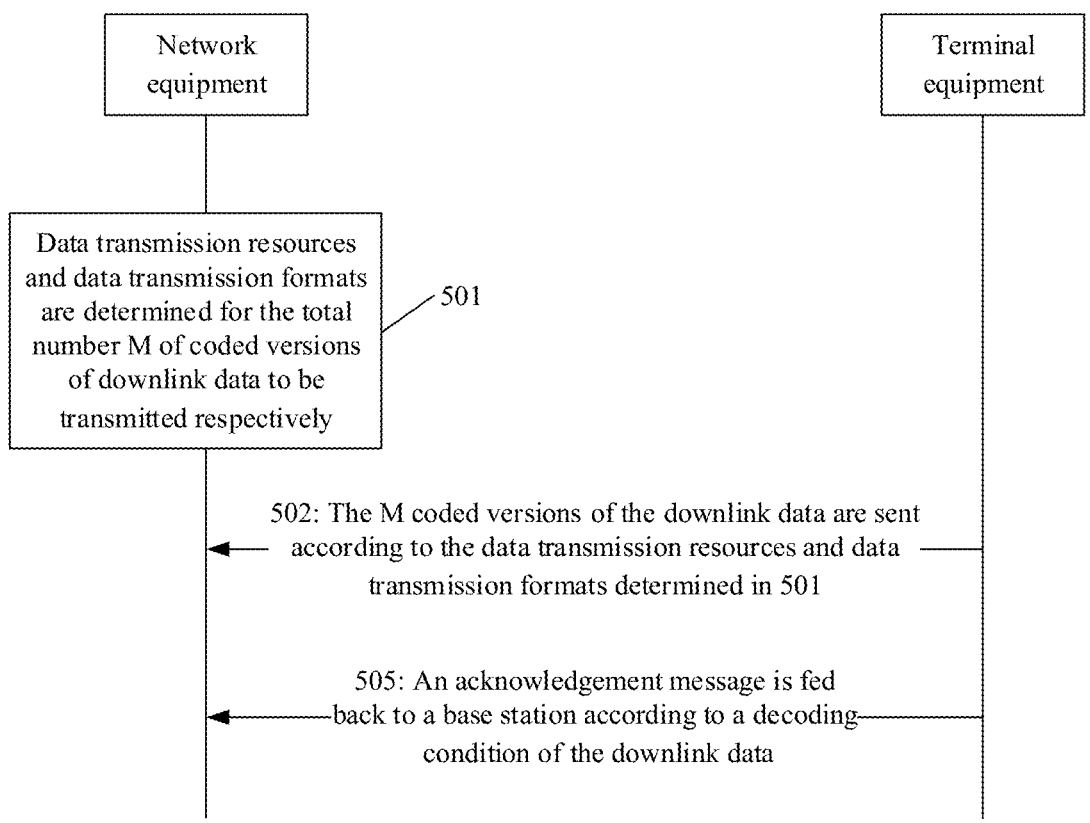
FIG. 12 is a schematic flowchart of a communication method according to an embodiment of the disclosure.

FIG. 12 is a schematic flowchart of a communication method 500 according to an embodiment of the disclosure.

In 501, network equipment determines a data transmission resource and data transmission format corresponding to each transmission version according to a number M of the transmission versions of downlink data to be transmitted.

In 502, the network equipment generates each transmission version according to the data transmission format corresponding to each transmission version and sends the transmission version through the corresponding data transmission resource.

Optionally, in the embodiment of the disclosure, the network equipment may concurrently send multiple transmission versions to the terminal equipment. Here, "concurrently" does not always mean strictly the same time but means that there is no need to wait for an acknowledgement message of another transmission version which has been sent before a certain transmission version of the data is sent.

In 503, the terminal equipment feeds back an acknowledgement message to a base station according to a demodulating and decoding condition.

Optionally, in the embodiment of the disclosure, a terminal may decode each transmission version independently and may also jointly decode any transmission versions to achieve a better decoding effect.

When the terminal equipment decodes each first transmission version independently and the M first transmission versions include a transmission version which may be successfully decoded, an ACK message is sent to the terminal equipment. When each first transmission version is decoded independently and none of the M transmission versions is successfully decoded, a NACK message is sent to the network equipment. Here, the NACK message includes information of the first transmission versions which are failed to be decoded to enable the network equipment to learn about the first transmission versions which are failed to be decoded.

Or, when the M first transmission versions are jointly decoded and joint decoding succeeds, the ACK message is sent to the network equipment.

When the M first transmission versions are jointly decoded and joint decoding fails, the NACK message is sent to the network equipment, wherein the NACK message includes information of N coded versions.

Optionally, in the embodiment of the disclosure, when receiving the NACK message sent by the terminal equipment, the network equipment may reselect data transmission resources and data transmission formats and generate and send the transmission versions to the terminal equipment according to the reselected data transmission resources and data transmission formats.

In the embodiment of the disclosure, multiple transmission versions of a piece of downlink data are concurrently sent on multiple resources, so that a radio link failure, caused by channel fading and interference, on a certain resource may be effectively overcome, transmission reliability may be improved, and a latency brought by pure time-domain retransmission may be reduced.

Figure 13:
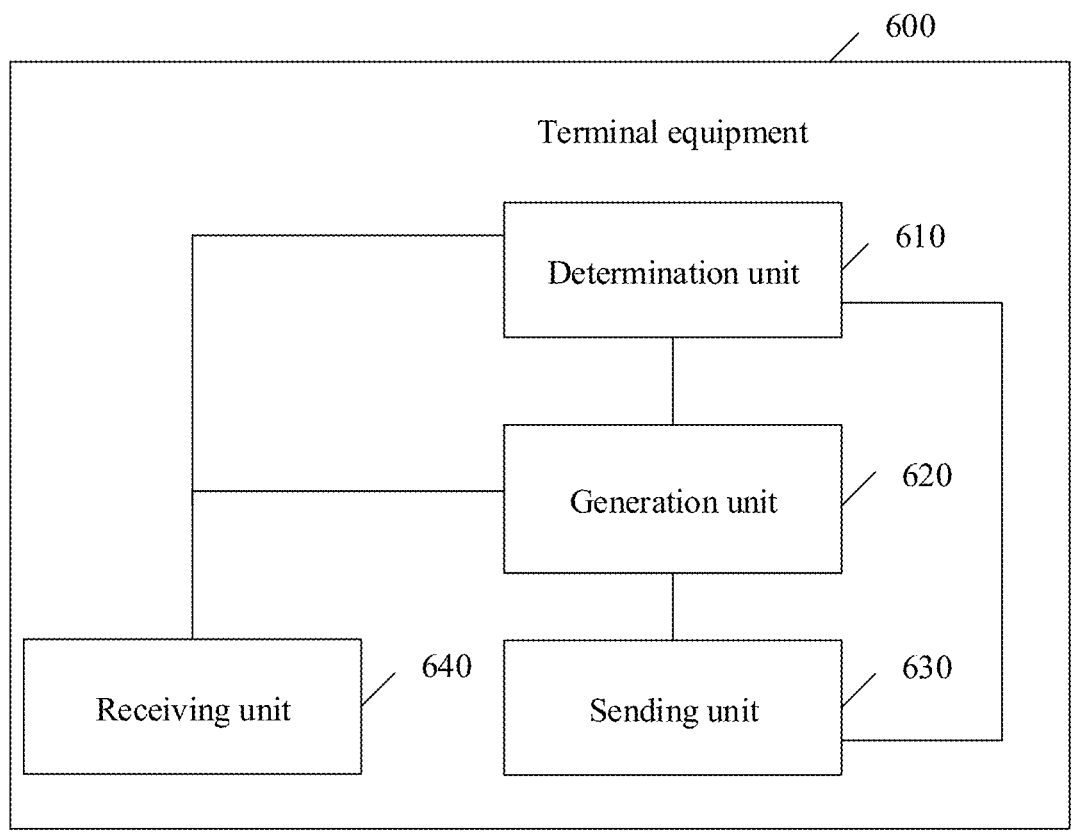
FIG. 13 is a schematic block diagram of a terminal equipment according to an embodiment of the disclosure.

FIG. 13 is a schematic block diagram of a terminal equipment 600 according to an embodiment of the disclosure. As illustrated in FIG. 13, the terminal equipment 600 includes: a determination unit 610, a sending unit 620 and a generation unit 630.

The determination unit 610 is configured to determine a first data transmission format and select a first data transmission resource from a data resource pool. Here, the first data transmission format is used in generating a first transmission version of UL data, and the first data transmission resource is configured to transmit the first transmission version.

The sending unit 620 is configured to send a first scheduling assignment message to network equipment. The first scheduling assignment message contains information of the first data transmission resource and information of the first data transmission format.

The generation unit 630 is configured to code and modulate the UL data according to the first data transmission format to generate the first transmission version.

The sending unit 620 is further configured to send the first transmission version to the network equipment through the first data transmission resource to enable the network equipment to receive, demodulate and decode the first transmission version according to the first scheduling assignment message.

Optionally, as illustrated in FIG. 13, the terminal equipment 600 further includes a receiving unit 640.

The sending unit 620 is further configured to send a UL resource scheduling request to the network equipment. Here, the UL resource scheduling request is configured to request the network equipment to allocate a UL resource to the UL data and the resource scheduling request includes information about an association relationship indicating that the resource scheduling request is associated with the first transmission version. Alternatively, the scheduling assignment message is further configured to request the network equipment to allocate the UL resource to the UL data and the scheduling assignment message includes the information about an association relationship indicating that the scheduling assignment message is associated with the first transmission version.

The receiving unit 640 is configured to receive a UL resource allocation response sent by the network equipment.

The generation unit 630 is configured to generate a second transmission version of the UL data according to a second data transmission format indicated in the UL resource allocation response.

The sending unit 620 is further configured to send the second transmission version through a second data transmission resource.

Optionally, as illustrated in FIG. 13, the terminal equipment 600 further includes a receiving unit 640.

The receiving unit 640 is configured to receive a NACK message sent by the network equipment for the first transmission version of the UL data.

The determination unit 610 is further configured to determine a third data transmission format and select a third data transmission resource from the data resource pool. Here, the third data transmission format is used in generating a third transmission version of the UL data and the third data transmission resource is configured to transmit the third transmission version.

The sending unit 620 is further configured to send a second scheduling assignment message to the network equipment. The second scheduling assignment message contains information of the third data transmission resource and information of the third data transmission format.

The generation unit 630 is further configured to code and modulate the UL data according to the third data transmission format to generate the third transmission version.

The sending unit 620 is further configured to send the third transmission version to the network equipment through the third data transmission resource to enable the network equipment to receive, demodulate and decode the third transmission version according to the second scheduling assignment message.

Optionally, the determination unit 610 is specifically configured to determine the first data transmission format used in generating each of the N first transmission versions, and determine N first data transmission resources from the data resource pool. Here, N is an integer equal to or greater than 2. Each of the N first data transmission resources is configured to transmit the first transmission version of the N first transmission versions corresponding to the first data transmission resource. Here, there are one to one correspondences between the N first data transmission resources and the N first transmission versions.

The sending unit 620 is specifically configured to send the first scheduling assignment message to the network equipment. The first scheduling assignment message indicates the first data transmission resource and first data transmission format corresponding to each of the N first transmission versions.

The generation unit 630 is specifically configured to generate each first transmission version according to the first data transmission format used in generating the first transmission version. The sending unit 620 is specifically configured to send the N first transmission versions of the UL data through the N first data transmission resources respectively.

Optionally, the sending unit 620 is specifically configured to send N first scheduling assignment messages to the network equipment. Here, there are one to one correspondences between the N first scheduling assignment messages and the N first transmission versions, and each first scheduling assignment message is configured to indicate the first data transmission format and first data transmission resource for the first transmission version corresponding to the first scheduling assignment message.

Alternatively, the sending unit 620 is specifically configured to send one first scheduling assignment message to the network equipment. Here, the one first scheduling assignment message indicates the first data transmission formats and first data transmission resources for the N first transmission versions.

Optionally, the sending unit 620 is specifically configured to:

send the first scheduling assignment message to the network equipment through a transmission resource which is configured by the network equipment for the first scheduling assignment message; or select a control transmission resource from a control resource pool and send the first scheduling assignment message to the network equipment through the control transmission resource.

Optionally, as illustrated in FIG. 13, the terminal equipment 600 further includes a receiving unit 640.

The receiving unit 640 is configured to receive resource pool configuration information sent by the network equipment. The resource pool configuration information includes configuration information of the data resource pool and configuration information of the control resource pool. Here, the data resource pool includes the UL resource that is selectable for transmitting the first transmission version, and the control resource pool includes a UL resource that is selectable for transmitting the scheduling assignment message.

It will be understood that the terminal equipment 600 according to the embodiment of the disclosure may correspond to the terminal equipment in the methods 200-400 in the embodiments of the disclosure and the abovementioned operations and/or functions of each unit of the terminal equipment 600 may be configured to execute each flow and/or step corresponding to the terminal equipment in the method embodiments and will not be elaborated herein to avoid repetitions.

Figure 14:
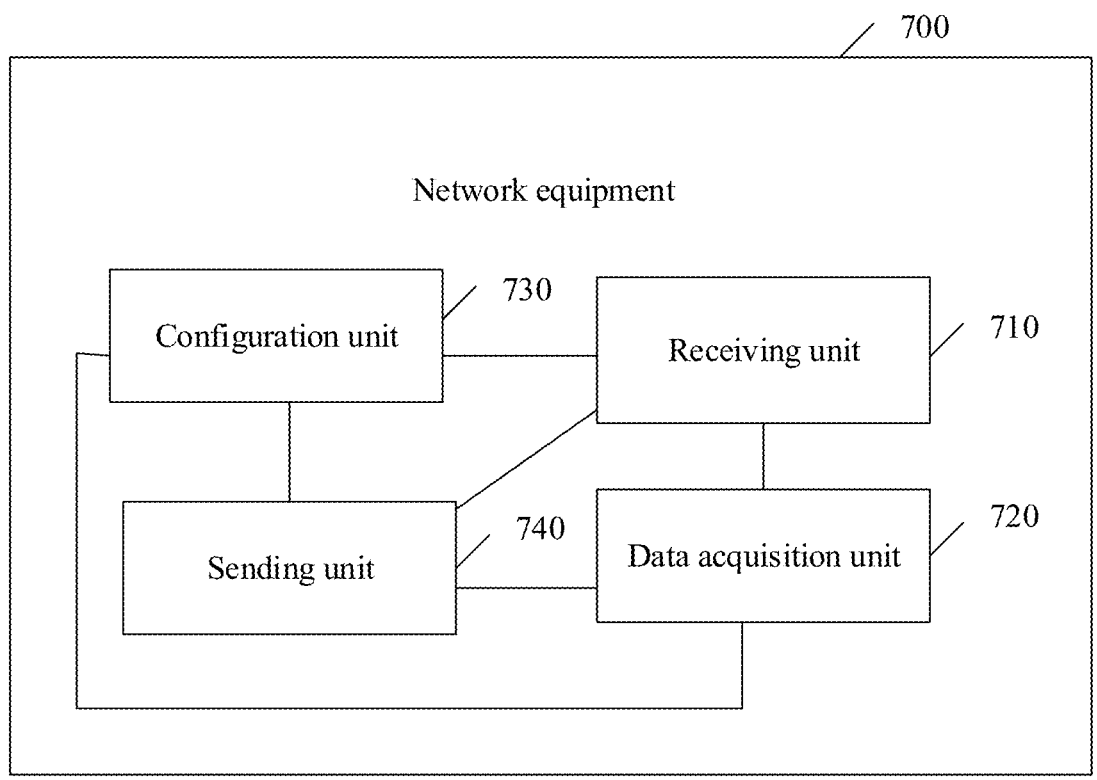
FIG. 14 is a schematic block diagram of a network equipment according to an embodiment of the disclosure.

FIG. 14 is a schematic block diagram of a network equipment 700 according to an embodiment of the disclosure. As illustrated in FIG. 14, the network equipment 700 includes a receiving unit 710 and a data acquisition unit 720.

The receiving unit 710 is configured to receive an scheduling assignment message sent by terminal equipment. Here, the scheduling assignment message indicates a first data transmission format and first data transmission resource corresponding to a first transmission version of UL data sent by the terminal equipment.

The data acquisition unit 720 is configured to receive, demodulate and decode the first transmission version of the UL data according to the first data transmission format and the first data transmission resource.

Optionally, as illustrated in FIG. 14, the network equipment 700 further includes a configuration unit 730, configured to configure a data resource pool for the terminal equipment, the data resource pool including a UL resource that is selectable by the terminal equipment for transmitting the first transmission version, and configure a control resource pool for the terminal equipment, the control resource pool including a UL resource that is selectable by the terminal equipment for transmitting the scheduling assignment message, or configure the UL resource for the terminal equipment to transmit the scheduling assignment message.

Optionally, the network equipment 700 further includes a sending unit 740 and a configuration unit 730.

The receiving unit 710 is configured to receive a UL resource scheduling request sent by the terminal equipment, wherein the UL resource scheduling request is configured to request network equipment to allocate a UL resource to the UL data and the resource scheduling request includes information about an association relationship indicating that the resource scheduling request is associated with the first transmission version, or the scheduling assignment message is further configured to request the network equipment to allocate the UL resource to the UL data and the scheduling assignment message includes the information about an association relationship indicating that the scheduling assignment message is associated with the first transmission version.

Responsive to the condition that the data acquisition unit 720 does not receive the first transmission version or the first transmission version is failed to be demodulated or decoded, the configuration unit 730 is configured to allocate a second data transmission resource to the UL data and determine a second data transmission format.

The sending unit 740 is further configured to send a UL resource allocation response to the terminal equipment. Here, the UL resource allocation response indicates the second data transmission resource and the second data transmission format to enable the terminal equipment to generate a second transmission version of the terminal equipment according to the second data transmission resource and the second data transmission format.

Optionally, the sending unit 740 is further configured to:
responsive to the condition that the data acquisition unit 720 successfully decodes the first transmission version of the UL data, send an ACK message to the terminal equipment and neglect the UL resource scheduling request.

Optionally, the sending unit 740 is further configured to: responsive to the condition that the data acquisition unit 720 does not receive the first transmission version or the first transmission version is failed to be demodulated or decoded, send NACK information to the terminal equipment.

Optionally, a first scheduling assignment message indicates a first data transmission format and first data transmission resource corresponding to each of N first transmission versions of the UL data sent by the terminal equipment, N being an integer equal to or greater than 2.

The data acquisition unit 720 is specifically configured to receive, demodulate and decode the N first transmission versions according to the first data transmission format and first data transmission resource corresponding to each of the N first transmission versions.

Optionally, the data acquisition unit 720 is specifically configured to decode each first transmission version independently or jointly decode the N first transmission versions.

Optionally, the network equipment 700 further includes a sending unit 740, wherein the sending unit 740 is configured to:
if the data acquisition unit jointly decodes the N first coded versions and joint decoding succeeds, send the ACK message to the terminal equipment; or
if the data acquisition unit jointly decodes the N first coded versions and joint decoding fails, send the NACK message or a UL resource allocation message to the terminal equipment, the NACK message including information of the first transmission versions which are failed to be decoded to enable the terminal equipment to learn about the first transmission versions which are failed to be decoded and the UL resource allocation message indicating the second data transmission resources and second data transmission formats determined for the terminal equipment to enable the terminal equipment to generate the second transmission version of the terminal equipment according to the second data transmission resources and the second data transmission formats.

Optionally, as illustrated in FIG. 14, the network equipment 700 further includes a sending unit 740, and the sending unit 740 is configured to:
if the data acquisition unit jointly decodes the N first coded versions and joint decoding succeeds, send the ACK message to the terminal equipment; or
if the data acquisition unit jointly decodes the N first coded versions and joint decoding fails, send the NACK message or the UL resource allocation message to the terminal equipment, the NACK message including the information of the first transmission versions which are failed to be decoded to enable the terminal equipment to learn about the first transmission versions which are failed to be decoded and the UL resource allocation message indicating the second data transmission resources and second data transmission formats determined for the terminal equipment to enable the terminal equipment to generate the second transmission version of the terminal equipment according to the second data transmission resources and the second data transmission formats.

Optionally, the receiving unit 710 is specifically configured to:
receive N first scheduling assignment messages sent by the terminal equipment, wherein there are one to one correspondences between the N first scheduling assignment messages and the N first transmission versions, and each first scheduling assignment message is configured to indicate the first data transmission format and first data transmission resource for the first transmission version corresponding to the first scheduling assignment message; or
receive one first scheduling assignment message sent by the terminal equipment, wherein the one first scheduling assignment message indicates the first data transmission formats and first data transmission resources for the N first transmission versions.

Optionally, the receiving unit 710 is specifically configured to:

perform blind detection on the scheduling assignment message sent by the terminal equipment through a resource indicated by the control resource pool; or receive the scheduling assignment message sent by the terminal equipment through a control resource configured for the scheduling assignment message of the terminal equipment.

It will be understood that the network equipment 700 according to the embodiment of the disclosure may correspond to the network equipment in the methods 200-400 in the embodiments of the disclosure and the abovementioned operations and/or functions of each unit of the network equipment 700 may be configured to execute each flow and/or step corresponding to the network equipment in the method embodiments and will not be elaborated herein to avoid repetitions.

Figure 15:
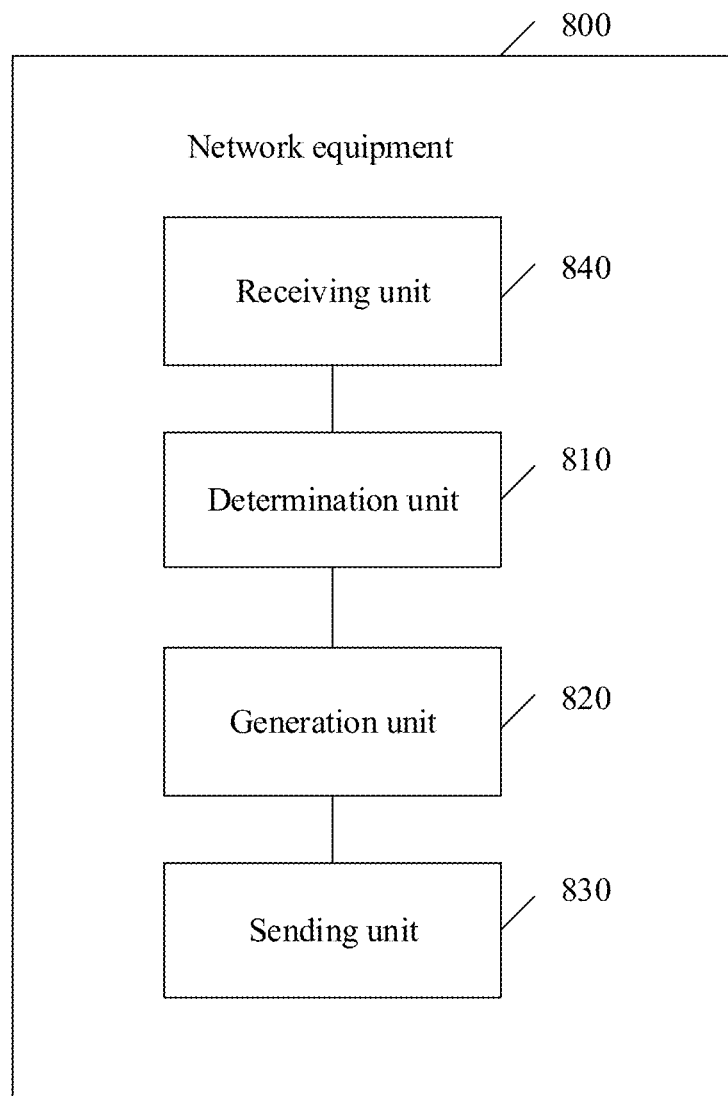
FIG. 15 is a schematic block diagram of a network equipment according to an embodiment of the disclosure.

FIG. 15 is a schematic block diagram of a network equipment 800 according to an embodiment of the disclosure. As illustrated in FIG. 15, the network equipment 800 includes a determination unit 810, a generation unit 820 and a sending unit 830.

The determination unit 810 is configured to determine a first data transmission format and first data transmission resource corresponding to each of M first coded versions of downlink data. Here, M is an integer equal to or greater than 2.

The generation unit 820 is configured to modulate and code the downlink data to obtain each first coded version according to the first data transmission format corresponding to each first coded version.

The sending unit 830 is configured to send each first coded version to terminal equipment through the first data transmission resource corresponding to each first coded version.

Optionally, as illustrated in FIG. 15, the network equipment 800 further includes a receiving unit 840, and the receiving unit 840 is configured to receive a NACK message of the terminal equipment for the M coded versions.

The determination unit 810 is further configured to select a second data transmission format and a second data transmission resource according to the NACK message.

The generation unit 820 is configured to generate a second transmission version of the downlink data according to the second data transmission format.

The sending unit 830 is configured to send the second transmission version through the second data transmission resource.

It will be understood that the network equipment 800 according to the embodiment of the disclosure may correspond to the network equipment in the method 500 in the embodiment of the disclosure and the abovementioned operations and/or functions of various unit of the network equipment 800 may be configured to execute each flow and/or step corresponding to the network equipment in the method embodiment and will not be elaborated herein to avoid repetitions.

Figure 16:
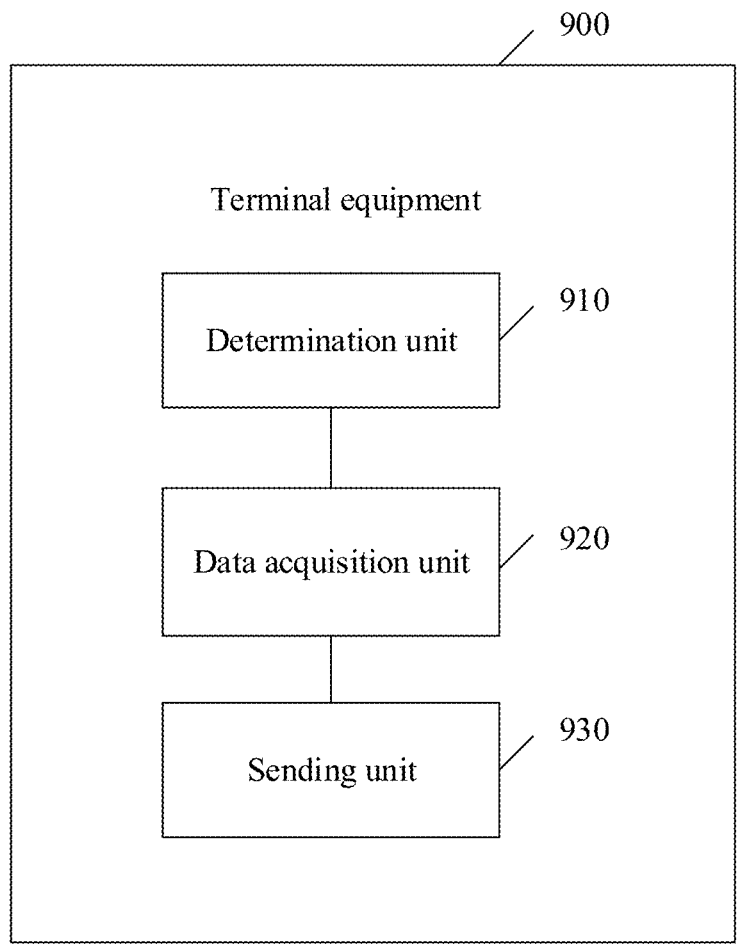
FIG. 16 is a schematic block diagram of a terminal equipment according to an embodiment of the disclosure.

FIG. 16 is a schematic block diagram of a terminal equipment 900 according to an embodiment of the disclosure. As illustrated in FIG. 16, the terminal equipment 900 includes a determination unit 910 and a data acquisition unit 920.

The determination unit 910 is configured to determine M first data transmission resources and M first data transmission formats corresponding to M first coded versions of downlink data sent by network equipment, wherein M is an integer equal to or greater than 2.

The data acquisition unit 920 is configured to receive, demodulate and decode each first coded version according to the M first data transmission resources and the M first data transmission formats.

Optionally, the data acquisition unit 920 is specifically configured to decode each first coded version independently or jointly decode the M first coded versions.

Optionally, as illustrated in FIG. 16, the terminal equipment 900 further includes a sending unit 930.

The sending unit 930 is configured to:

responsive to the condition that the data acquisition unit 920 decodes each first transmission version independently and the M first transmission versions include a transmission version which may be successfully decoded, send an ACK message to the network equipment; and responsive to the condition that the data acquisition unit 920 decodes each first transmission version independently and none of the M transmission versions is successfully decoded, send a NACK message to the network equipment, wherein the NACK message includes information of the first transmission versions which are failed to be decoded to enable the network equipment to learn about the first transmission versions which are failed to be decoded.

Optionally, as illustrated in FIG. 16, the terminal equipment 900 further includes a sending unit 930.

The sending unit 930 is configured to:

responsive to the condition that the data acquisition unit 920 jointly decodes N first coded versions and joint decoding succeeds, send the ACK message to the network equipment; or responsive to the condition that the data acquisition unit 920 jointly decodes the M first coded versions and joint decoding succeeds, send the NACK message to the network equipment, wherein the NACK message includes information of the N first transmission versions.

It will be understood that the terminal equipment 900 according to the embodiment of the disclosure may correspond to the terminal equipment in the method 500 in the embodiment of the disclosure and the abovementioned operations and/or functions of each unit of the terminal equipment 900 may be configured to execute each flow and/or step corresponding to the terminal equipment in the method embodiment and will not be elaborated herein to avoid repetitions.

Figure 17:
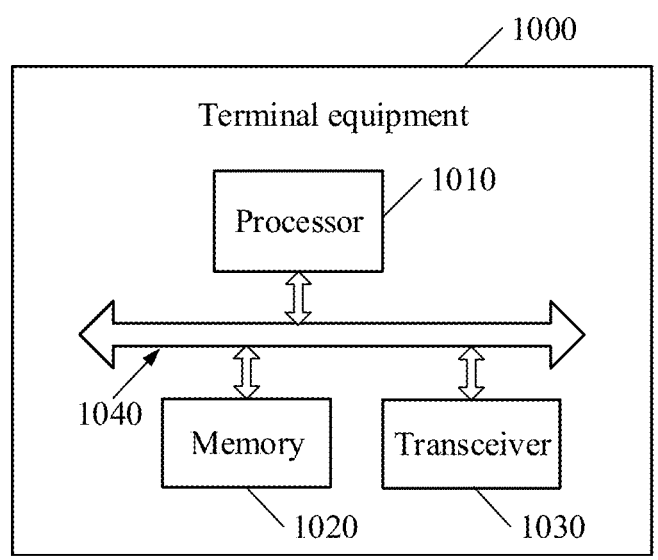
FIG. 17 is a schematic block diagram of a terminal equipment according to an embodiment of the disclosure.

FIG. 17 is a schematic block diagram of a network equipment 1000 according to an embodiment of the disclosure. As illustrated in FIG. 17, the terminal equipment 1000 includes a processor 1010, a memory 1020 and a transceiver 1030. Optionally, the terminal equipment further includes a bus system 1040 configured to interconnect the processor 1010, the memory 1020 and the transceiver 1030, wherein the memory 1020 is configured to store instructions, and the processor 1010 is configured to call the instructions of the memory 1020 to execute the following operations:

determining a first data transmission format, the first data transmission format being used in generating a first transmission version of UL data;

selecting a first data transmission resource from a data resource pool, the first data transmission resource being configured to transmit the first transmission version;

indicating the transceiver 1030 to send a first scheduling assignment message to network equipment, the first scheduling assignment message containing information of the first data transmission resource and information of the first data transmission format;

coding and modulating the UL data according to the first data transmission format to generate the first transmission version; and indicating the transceiver 1030 to send the first transmission version to the network equipment through the first data transmission resource to enable the network equipment to receive, demodulate and decode the first transmission version according to the first scheduling assignment message.

Optionally, the processor 1010 is configured to call the instructions of the memory 1020 to further execute the following operations:

indicating the transceiver 1030 to send a UL resource scheduling request to the network equipment, wherein the UL resource scheduling request is configured to request the network equipment to allocate a UL resource to the UL data and the resource scheduling request includes information about an association relationship indicating that the resource scheduling request is associated with the first transmission version, or the scheduling assignment message is further configured to request the network equipment to allocate the UL resource to the UL data and the scheduling assignment message includes the information about an association relationship indicating that the scheduling assignment message is associated with the first transmission version; and responsive to reception of a UL resource allocation response sent by the network equipment through the transceiver 1030, generating and sending a second transmission version of the UL data according to a second data transmission format and second data transmission resource indicated in the UL resource allocation response.

Optionally, the processor 1010 is configured to call the instructions of the memory 1020 to further execute the following operations:

responsive to reception of a NACK message sent by the network equipment for the first transmission version of the UL data through the transceiver 1030, determining a third data transmission format and selecting a third data transmission resource from the data resource pool, the third data transmission format being used in generating a third transmission version of the UL data and the third data transmission resource being configured to transmit the third transmission version;

sending a second scheduling assignment message to the network equipment through the transceiver 1030, the second scheduling assignment message containing information of the third data transmission resource and information of the third data transmission format;

coding and modulating the UL data according to the third data transmission format to generate the third transmission version; and sending the third transmission version through the third data transmission resource and through the transceiver 1030 to enable a receiver to receive, demodulate and decode the third transmission version according to the second scheduling assignment message.

Optionally, the processor 1010 is configured to call the instructions of the memory 1020 to further execute the following operations:

determining the first data transmission format used in generating each of the N first transmission versions, N being an integer equal to or greater than 2;

determining N first data transmission resources from the data resource pool, each of the N first data transmission resources being configured to transmit the first transmission version of the N first transmission versions corresponding to the first data transmission resource, wherein there are one to one correspondences between the N first data transmission resources and the N first transmission versions;

sending the first scheduling assignment message to the network equipment through the transceiver 1030, the first scheduling assignment message indicating the first data transmission resource and first data transmission format corresponding to each of the N first transmission versions;

generating each first transmission version according to the first data transmission format used in generating the first transmission version; and sending the corresponding versions in the N first transmission versions of the UL data through the transceiver 1030 and through the N parts of first data transmission resources respectively.

Optionally, the processor 1010 is configured to call the instructions of the memory 1020 to further execute the following operations:

sending N first scheduling assignment messages to the network equipment through the transceiver 1030, wherein there are one to one correspondences between the N first scheduling assignment messages and the N first transmission versions, and each first scheduling assignment message is configured to indicate the first data transmission format and first data transmission resource for the first transmission version corresponding to the first scheduling assignment message; or sending one first scheduling assignment message to the network equipment through the transceiver 1030, wherein the one first scheduling assignment message indicates the first data transmission formats and first data transmission resources for the N first transmission versions.

Optionally, the processor 1010 is configured to call the instructions of the memory 1020 to further execute the following operations:

sending the first scheduling assignment message to the network equipment through the transceiver 1030 through a transmission resource which is configured by the network equipment for the first scheduling assignment message; or selecting a control transmission resource from a control resource pool, and sending the first scheduling assignment message to the network equipment through the transceiver 1030 and through the control transmission resource.

Optionally, the processor 1010 is configured to call the instructions of the memory 1020 to further execute the following operation:

receiving resource pool configuration information sent by the network equipment through the transceiver 1030, the resource pool configuration information including configuration information of the data resource pool and configuration information of the control resource pool, wherein the data resource pool includes the UL resource that is selectable for transmitting the first transmission version, and the control resource pool includes a UL resource that is selectable for transmitting the scheduling assignment message.

It will be understood that the terminal equipment 1000 according to the embodiment of the disclosure may correspond to the terminal equipment in the methods 200-400 in the embodiments of the disclosure and the abovementioned operations and/or functions of each unit of the terminal equipment 1000 may be configured to execute each flow and/or step corresponding to the terminal equipment in the method embodiments and will not be elaborated herein to avoid repetitions.

Figure 18:
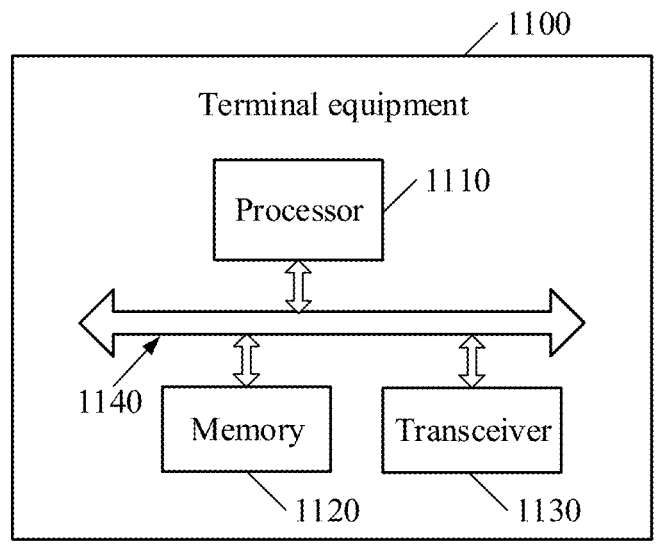
FIG. 18 is a schematic block diagram of a network equipment according to an embodiment of the disclosure.

FIG. 18 is a schematic block diagram of a network equipment 1100 according to an embodiment of the disclosure. As illustrated in FIG. 18, the network equipment 1100 includes a processor 1110, a memory 1120 and a transceiver 1130. Optionally, the network equipment further includes a bus system 1140 configured to interconnect the processor 1110, the memory 1120 and the transceiver 1130, wherein the memory 1120 is configured to store instructions, and the processor 1110 is configured to call the instructions of the memory 1120 to execute the following operations:

receiving an scheduling assignment message sent by terminal equipment through the transceiver 1130, the scheduling assignment message indicating a first data transmission format and first data transmission resource corresponding to a first transmission version of UL data sent by the terminal equipment; and receiving, demodulating and decoding the first transmission version of the UL data according to the first data transmission format and the first data transmission resource.

Optionally, the processor 1110 is configured to call the instructions of the memory 1120 to further execute the following operations:

configuring a data resource pool to the terminal equipment, the data resource pool including a UL resource that is selectable by the terminal equipment for transmitting the first transmission version; and configuring a control resource pool for the terminal equipment, the control resource pool including a UL resource that is selectable by the terminal equipment for transmitting the scheduling assignment message, or configuring the UL resource for the terminal equipment to transmit the scheduling assignment message.

Optionally, the processor 1110 is configured to call the instructions of the memory 1120 to further execute the following operations:

receiving a UL resource scheduling request sent by the terminal equipment through the transceiver 1130, wherein the UL resource scheduling request is configured to request network equipment to allocate a UL resource to the UL data and the resource scheduling request includes information about an association relationship indicating that the resource scheduling request is associated with the first transmission version, or the scheduling assignment message is further configured to request the network equipment to allocate the UL resource to the UL data and the scheduling assignment message includes the information about an association relationship indicating that the scheduling assignment message is associated with the first transmission version;

responsive to the condition that the first transmission version is not received through the transceiver 1130 or the first transmission version is failed to be demodulated or decoded, allocating a second data transmission resource to the UL data and determining a second data transmission format; and sending a UL resource allocation response to the terminal equipment through the transceiver 1130, wherein the UL resource allocation response indicates the second data transmission resource and the second data transmission format to enable the terminal equipment to generate a second transmission version of the terminal equipment according to the second data transmission resource and the second data transmission format.

Optionally, the processor 1110 is configured to call the instructions of the memory 1120 to further execute the following operations:

responsive to successful decoding of the first transmission version of the UL data, sending an ACK message to the terminal equipment through the transceiver 1130, and neglecting the UL resource scheduling request.

Optionally, the processor 1110 is configured to call the instructions of the memory 1120 to further execute the following operation:

responsive to the condition that the first transmission version is not received through the transceiver 1130 or the first transmission version is failed to be demodulated or decoded, sending NACK information to the terminal equipment through the transceiver 1130.

Optionally, a first scheduling assignment message indicates a first data transmission format and first data transmission resource corresponding to each of N first transmission versions of the UL data sent by the terminal equipment, N being an integer equal to or greater than 2; and optionally, the processor 1110 is configured to call the instructions of the memory 1120 to further execute the following operations:

receiving, demodulating and decoding the N first transmission versions according to the first data transmission format and first data transmission resource corresponding to each of the N first transmission versions.

Optionally, the processor 1110 is configured to call the instructions of the memory 1120 to further execute the following operations:

decoding each first transmission version independently or jointly decoding the N first transmission versions.

Optionally, the processor 1110 is configured to call the instructions of the memory 1120 to further execute the following operations:

if each first transmission version is decoded independently and the N first transmission versions include a transmission version which may be successfully decoded, sending the ACK message to the terminal equipment; and if each first transmission version is decoded independently and none of the N first transmission versions is successfully decoded, sending a NACK message or a UL resource allocation message to the terminal equipment, the NACK message including information of the first transmission versions which are failed to be decoded to enable the terminal equipment to learn about the first transmission versions which are failed to be decoded and the UL resource allocation message indicating the second data transmission resources and second data transmission formats determined for the terminal equipment to enable the terminal equipment to generate the second transmission version of the terminal equipment according to the second data transmission resources and the second data transmission formats.

Optionally, the processor 1110 is configured to call the instructions of the memory 1120 to further execute the following operations:

if the N first coded versions are jointly decoded and joint decoding succeeds, sending the ACK message to the terminal equipment; or if the N first coded versions are jointly decoded and joint decoding fails, sending the NACK message or a UL resource allocation message to the terminal equipment, the NACK message including the information of the first transmission versions which are failed to be decoded to enable the terminal equipment to learn about the first transmission versions which are failed to be decoded and the UL resource allocation message indicating the second data transmission resources and second data transmission formats determined for the terminal equipment to enable the terminal equipment to generate the second transmission version of the terminal equipment according to the second data transmission resources and the second data transmission formats.

Optionally, the processor 1110 is configured to call the instructions of the memory 1120 to further execute the following operations:

receiving N first scheduling assignment messages sent by the terminal equipment through the transceiver 1130, wherein there are one to one correspondences between the N first scheduling assignment messages and the N first transmission versions, and each first scheduling assignment message is configured to indicate the first data transmission format and first data transmission resource for the first transmission version corresponding to the first scheduling assignment message; or receiving one first scheduling assignment message sent by the terminal equipment through the transceiver 1130, wherein the one first scheduling assignment message indicates the first data transmission formats and first data transmission resources for the N first transmission versions.

Optionally, the processor 1110 is configured to call the instructions of the memory 1120 to further execute the following operations:

performing blind detection on the scheduling assignment message sent by the terminal equipment through the transceiver 1130 through a resource indicated by the control resource pool; or receiving the scheduling assignment message sent by the terminal equipment through the transceiver 1130 through a control resource configured for the scheduling assignment message of the terminal equipment.

It will be understood that the network equipment 1100 according to the embodiment of the disclosure may correspond to the network equipment in the methods 200-400 in the embodiments of the disclosure and the abovementioned operations and/or functions of each unit of the network equipment 1100 may be configured to execute each flow and/or step corresponding to the network equipment in the method embodiments and will not be elaborated herein to avoid repetitions.

Figure 19:
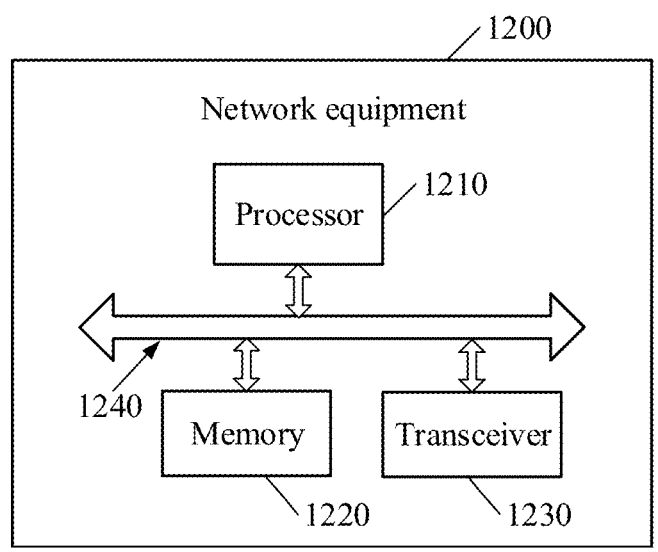
FIG. 19 is a schematic block diagram of a network equipment according to an embodiment of the disclosure.

FIG. 19 is a schematic block diagram of a network equipment 1200 according to an embodiment of the disclosure. As illustrated in FIG. 19, the network equipment 1200 includes a processor 1210, a memory 1220 and a transceiver 1230. Optionally, the network equipment further includes a bus system 1240 configured to interconnect the processor 1210, the memory 1220 and the transceiver 1230, wherein the memory 1220 is configured to store instructions, and the processor 1210 is configured to call the instructions of the memory 1220 to execute the following operations:

determining a first data transmission format and first data transmission resource corresponding to each of M first coded versions of downlink data, wherein M is an integer equal to or greater than 2;

modulating and coding the downlink data to obtain each first coded version according to the first data transmission format corresponding to each first coded version; and sending each first coded version to terminal equipment through the transceiver 1230 through the first data transmission resource corresponding to each first coded version.

Optionally, the processor 1210 is configured to call the instructions of the memory 1220 to further execute the following operations:

receiving a NACK message of the terminal equipment for the M coded versions through the transceiver 1230; and selecting a second data transmission format and a second data transmission resource according to the NACK message, and generating and sending, through the transceiver 1230, a second transmission version of the downlink data according to the second data transmission format and the second data transmission resource.

It will be understood that the network equipment 1200 according to the embodiment of the disclosure may correspond to the network equipment in the method 500 in the embodiment of the disclosure and the abovementioned operations and/or functions of each unit of the network equipment 1200 may be configured to execute each flow and/or step corresponding to the network equipment in the method embodiment and will not be elaborated herein to avoid repetitions.

Figure 20:
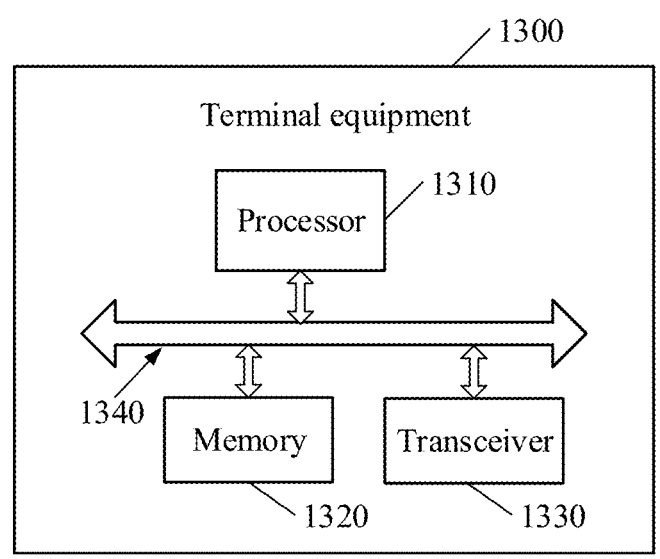
FIG. 20 is a schematic block diagram of a terminal equipment according to an embodiment of the disclosure.

FIG. 20 is a schematic block diagram of a terminal equipment 1300 according to an embodiment of the disclosure. As illustrated in FIG. 20, the terminal equipment 1300 includes a processor 1310, a memory 1320 and a transceiver 1330. Optionally, the terminal equipment further includes a bus system 1340 configured to interconnect the processor 1310, the memory 1320 and the transceiver 1330, wherein the memory 1320 is configured to store instructions, and the processor 1310 is configured to call the instructions of the memory 1320 to execute the following operations:

Determining M first data transmission resources and M first data transmission formats corresponding to M first coded versions of downlink data sent by network equipment, wherein M is an integer equal to or greater than 2; and receiving, demodulating and decoding the respective M first coded version through the transceiver 1330 according to the M first data transmission resources and the M first data transmission formats.

Optionally, the processor 1310 is configured to call the instructions of the memory 1320 to further execute the following operations:

decoding each first coded version independently or jointly decoding the M first coded versions.

Optionally, the processor 1310 is configured to call the instructions of the memory 1320 to further execute the following operations:

responsive to the condition that each first transmission version is decoded independently and the M first transmission versions include a transmission version which may be successfully decoded, sending an ACK message to the network equipment through the transceiver 1330; and responsive to the condition that each first transmission version is decoded independently and none of the M transmission versions is successfully decoded, sending a NACK message to the network equipment through the transceiver 1330, wherein the NACK message includes information of the first transmission versions which are failed to be decoded to enable the network equipment to learn about the first transmission versions which are failed to be decoded.

Optionally, the processor 1310 is configured to call the instructions of the memory 1320 to further execute the following operations:

responsive to the condition that N first coded versions are jointly decoded and joint decoding succeeds, sending the ACK message to the network equipment through the transceiver 1330; or responsive to the condition that the M first coded versions are jointly decoded and joint decoding succeeds, sending the NACK message to the network equipment through the transceiver 1330, wherein the NACK message includes information of the N first transmission versions.

It will be understood that the terminal equipment 1300 according to the embodiment of the disclosure may correspond to the terminal equipment in the method 500 in the embodiment of the disclosure and the abovementioned operations and/or functions of each unit of the terminal equipment 1300 may be configured to execute each flow and/or step corresponding to the terminal equipment in the method embodiment and will not be elaborated herein to avoid repetitions.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it will be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, various function units in embodiments of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in various embodiments of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
   determining a first data transmission format, the first data transmission format being used in generating a first transmission version of uplink (UL) data;
   selecting a first data transmission resource from a data resource pool, the first data transmission resource being configured to transmit the first transmission version;
   sending a first scheduling assignment message to network equipment, the first scheduling assignment message containing information of the first data transmission resource and information of the first data transmission format;
   coding the UL data according to the first data transmission format and modulating the coded UL data to generate the first transmission version, and
   sending the first transmission version to the network equipment through the first data transmission resource;
   responsive to reception of a Non-Acknowledge (NACK) message sent by the network equipment for the first transmission version of the UL data, determining a third data transmission format and selecting a third data transmission resource from the data resource pool, the third data transmission format being used in generating a third transmission version of the UL data and the third data transmission resource being configured to transmit the third transmission version;
   sending a second scheduling assignment message to the network equipment, the second scheduling assignment message containing information of the third data transmission resource and information of the third data transmission format;
   coding and modulating the UL data according to the third data transmission format to generate the third transmission version; and
   sending the third transmission version to the network equipment through the third data transmission resource to enable the network equipment to receive, demodulate and decode the third transmission version according to the second scheduling assignment message.

2. The method as claimed in claim 1, wherein sending the first transmission version to the network equipment through the first data transmission resource is configured for the network equipment to demodulate and decode the first transmission version according to the first scheduling assignment message.

3. The method as claimed in any one of claim 1, wherein sending the first scheduling assignment message to the network equipment comprises:
   sending the first scheduling assignment message to the network equipment through a transmission resource which is configured by the network equipment for the first scheduling assignment message; or
   selecting a control transmission resource from a control resource pool, and sending the first scheduling assignment message to the network equipment through the control transmission resource.

4. The method as claimed in claim 3, wherein before selecting the first data transmission resource from the data resource pool, the method further comprises:
   receiving resource pool configuration information sent by the network equipment, the resource pool configuration information comprising configuration information of the data resource pool and configuration information of the control resource pool, wherein the data resource pool comprises the UL resource that is selectable for transmitting the first transmission version, and the control resource pool comprises a UL resource that is selectable for transmitting the scheduling assignment message.

5. The method as claimed in claim 1, wherein the method further comprises:
obtaining, ACK message for indicating success of demodulating and decoding the transmission version of the UL data; and
obtaining, NACK message for indicating failure of demodulating and decoding the transmission version of the UL data.

6. The method as claimed in claim 1, wherein the data transmission format comprises a coded version.

7. A communication method, performed by network equipment, comprising:
receiving a scheduling assignment message sent by terminal equipment, the scheduling assignment message indicating a first data transmission format and first data transmission resource corresponding to a first transmission version of uplink (UL) data sent by the terminal equipment; and
receiving first transmission version sent by terminal equipment through the first data transmission resource;
demodulating the first transmission version of the UL data and decoding the demodulated first transmission version of the UL data according to the first data transmission format and the first data transmission resource,
wherein receiving the scheduling assignment message sent by the terminal equipment comprises:
performing blind detection on the scheduling assignment message sent by the terminal equipment through a resource indicated by the control resource pool; or
receiving the scheduling assignment message sent by the terminal equipment through a control resource configured for the scheduling assignment message of the terminal equipment.

8. The method as claimed in claim 7, before receiving the scheduling assignment message sent by the terminal equipment, further comprising:
configuring a data resource pool to the terminal equipment, the data resource pool comprising a UL resource that is selectable by the terminal equipment for transmitting the first transmission version; and
configuring a control resource pool for the terminal equipment, the control resource pool comprising a UL resource that is selectable by the terminal equipment for transmitting the scheduling assignment message, or configuring the UL resource for the terminal equipment to transmit the scheduling assignment message.

9. The method as claimed in claim 7, further comprising:
sending an Acknowledge (ACK) message for indicating success of demodulating and decoding the transmission version of the UL data.

10. The method as claimed in claim 7, further comprising:
sending an Non-Acknowledge (NACK) message for indicating failure of demodulating and decoding the transmission version of the UL.

11. The method as claimed in claim 8, wherein the data transmission format comprises a coded version.

12. A terminal equipment, comprising a processor, a transceiver and a memory, wherein the memory is configured to store instructions, and the processor is configured to call the instructions of the memory to execute the following operations:
determining a first data transmission format, the first data transmission format being used in generating a first transmission version of uplink (UL) data;
selecting a first data transmission resource from a data resource pool, the first data transmission resource being configured to transmit the first transmission version;
sending, through the transceiver, a first scheduling assignment message to a network equipment, the first scheduling assignment message containing information of the first data transmission resource and information of the first data transmission format;
coding the UL data according to the first data transmission format modulating the coded UL data to generate the first transmission version; and
sending, through the transceiver, the first transmission version to the network equipment through the first data transmission resource;
responsive to reception of a Non-Acknowledge (NACK) message sent by the network equipment for the first transmission version of the UL data, determining a third data transmission format and selecting a third data transmission resource from the data resource pool, the third data transmission format being used in generating a third transmission version of the UL data and the third data transmission resource being configured to transmit the third transmission version;
sending a second scheduling assignment message to the network equipment, the second scheduling assignment message containing information of the third data transmission resource and information of the third data transmission format;
coding and modulating the UL data according to the third data transmission format to generate the third transmission version; and
sending the third transmission version to the network equipment through the third data transmission resource to enable the network equipment to receive, demodulate and decode the third transmission version according to the second scheduling assignment message.

13. The terminal equipment as claimed in claim 12, wherein sending, through the transceiver, the first transmission version to the network equipment through the first data transmission resource is configured for the network equipment to demodulate and decode the first transmission version according to the first scheduling assignment message.

14. The terminal equipment as claimed in claim 12, wherein sending, through the transceiver, the first scheduling assignment message to the network equipment comprises:
sending, through the transceiver, the first scheduling assignment message to the network equipment through a transmission resource which is configured by the network equipment for the first scheduling assignment message; or
selecting a control transmission resource from a control resource pool, and indicating the transceiver to send the first scheduling assignment message to the network equipment through the control transmission resource.

15. The terminal equipment as claimed in claim 14, wherein before selecting the first data transmission resource from the data resource pool, the operations further comprises:
receiving, through the transceiver, resource pool configuration information sent by the network equipment, the resource pool configuration information comprising configuration information of the data resource pool and configuration information of the control resource pool, wherein the data resource pool comprises the UL resource that is selectable for transmitting the first transmission version, and the control resource pool comprises a UL resource that is selectable for transmitting the scheduling assignment message.

16. The terminal equipment as claimed in claim 12, wherein the operations further comprises:
   obtaining, ACK message for indicating success of demodulating and decoding the transmission version of the UL data; and
   obtaining, NACK message for indicating failure of demodulating and decoding the transmission version of the UL data.

17. The terminal equipment as claimed in claim 12, wherein the data transmission format comprises a coded version.

18. A network equipment, comprising a processor, a transceiver and a memory, wherein the memory is configured to store instructions, and the processor is configured to call the instructions of the memory to execute the following operations:
   receiving, through the transceiver, a scheduling assignment message sent by a terminal equipment, the scheduling assignment message indicating a first data transmission format and first data transmission resource corresponding to a first transmission version of uplink (UL) data sent by the terminal equipment; and
   receiving, through the transceiver, first transmission version sent by terminal equipment through the first data transmission resource;
   demodulating the first transmission version of the UL data and decoding the demodulated first transmission version of the UL data according to the first data transmission format and the first data transmission resource,
   wherein receiving the scheduling assignment message sent by the terminal equipment comprises:
   performing blind detection on the scheduling assignment message sent by the terminal equipment through a resource indicated by the control resource pool; or
   receiving the scheduling assignment message sent by the terminal equipment through a control resource configured for the scheduling assignment message of the terminal equipment.

19. The network equipment as claimed in claim 18, before receiving the scheduling assignment message sent by the terminal equipment, the operations further comprises:
   configuring a data resource pool for the terminal equipment, the data resource pool comprising a UL resource that is selectable by the terminal equipment for transmitting the first transmission version, and
   configuring a control resource pool for the terminal equipment, the control resource pool comprising a UL resource that is selectable by the terminal equipment for transmitting the scheduling assignment message, or configure the UL resource for the terminal equipment to transmit the scheduling assignment message.

20. The network equipment as claimed in claim 18, wherein the operations further comprises:
   sending an Acknowledge (ACK) message for indicating success of demodulating and decoding the transmission version of the UL data.

21. The network equipment as claimed in claim 18, wherein the operations further comprises:
   sending an Non-Acknowledge (NACK) message for indicating failure of demodulating and decoding the transmission version of the UL.

22. The network equipment as claimed in claim 19, wherein the data transmission format comprises a coded version.

* * * * *